US007146305B2

(12) United States Patent
van der Made

(10) Patent No.: US 7,146,305 B2
(45) Date of Patent: Dec. 5, 2006

(54) ANALYTICAL VIRTUAL MACHINE

(75) Inventor: Peter A. J. van der Made, Newport Beach (AU)

(73) Assignee: vCIS, Inc., Pacific Palisades, CA (US)

( * ) Notice: Subject to any disclaimer, the term of this patent is extended or adjusted under 35 U.S.C. 154(b) by 709 days.

(21) Appl. No.: 09/885,427

(22) Filed: Jun. 19, 2001

(65) Prior Publication Data

US 2002/0056076 A1 May 9, 2002

Related U.S. Application Data

(60) Provisional application No. 60/242,939, filed on Oct. 24, 2000.

(51) Int. Cl.
*G06F 9/45* (2006.01)
(52) U.S. Cl. .............................. 703/22; 726/24; 703/23; 703/26; 703/27
(58) Field of Classification Search ................ 703/22, 703/23, 24, 26, 27; 726/24
See application file for complete search history.

(56) References Cited

U.S. PATENT DOCUMENTS

| 4,223,380 | A | 9/1980 | Antonaccio et al. ........ 709/225 |
| 4,400,769 | A | 8/1983 | Kaneda et al. ............... 710/267 |
| 4,672,609 | A | 6/1987 | Humphrey et al. .......... 714/719 |
| 4,773,028 | A | 9/1988 | Tallman ....................... 714/736 |
| 4,819,234 | A | 4/1989 | Huber .......................... 717/129 |
| 4,975,950 | A | 12/1990 | Lentz ........................... 726/24 |
| 5,032,979 | A | 7/1991 | Hecht et al. .................. 726/25 |
| 5,121,345 | A | 6/1992 | Lentz ........................... 713/188 |
| 5,204,966 | A | 4/1993 | Wittenberg et al. ............ 726/6 |
| 5,210,704 | A | 5/1993 | Husseiny ..................... 702/34 |
| 5,274,824 | A | 12/1993 | Howarth ...................... 713/167 |
| 5,278,901 | A | 1/1994 | Shieh et al. .................. 726/22 |
| 5,309,562 | A | 5/1994 | Li ................................ 709/237 |
| 5,311,593 | A | 5/1994 | Carmi .......................... 713/162 |
| 5,345,595 | A | 9/1994 | Johnson et al. .............. 455/410 |
| 5,347,450 | A | 9/1994 | Nugent ........................ 709/243 |
| 5,353,393 | A | 10/1994 | Bennett et al. .............. 345/641 |
| 5,359,659 | A | 10/1994 | Rosenthal ..................... 726/24 |
| 5,371,852 | A | 12/1994 | Attanasio et al. ............ 709/245 |
| 5,398,196 | A | 3/1995 | Chambers ..................... 714/28 |
| 5,414,833 | A | 5/1995 | Hershey et al. ............... 726/22 |

(Continued)

FOREIGN PATENT DOCUMENTS

EP 0 636 977 A2 2/1995

(Continued)

OTHER PUBLICATIONS

Jieh-Sheng Lee, Jieh Hsiang, and Po-Hao Tsang, "A Generic Virus Detection Agent on the Internet", 1997, IEEE, 30th Annual Hawaii International Conference on System Sciences, vol. 4.*

(Continued)

*Primary Examiner*—Paul Rodriguez
*Assistant Examiner*—Russ Guill
(74) *Attorney, Agent, or Firm*—King & Spalding LLP

(57) ABSTRACT

An analytical virtual machine (AVM) analyzes computer code using a software processor including a register that stores behavior flags indicative of behaviors identified by virtually executing the code within the virtual machine. The AVM includes a sequencer that stores the sequence in which behavior flags are set in the behavior flags register. The AVM analyzes machine performance by emulating execution of the code being analyzed on a fully virtual machine and records the observed behavior. When emulation and analysis are complete, the AVM returns the behavior flags register and sequencer to the real machine and terminates.

15 Claims, 8 Drawing Sheets

U.S. PATENT DOCUMENTS

| | | | |
|---|---|---|---|
| 5,440,723 A | 8/1995 | Arnold et al. | 714/2 |
| 5,452,442 A | 9/1995 | Kephart | 714/38 |
| 5,454,074 A | 9/1995 | Hartel et al. | 715/710 |
| 5,475,839 A | 12/1995 | Watson et al. | 713/2 |
| 5,511,184 A | 4/1996 | Lin | 710/261 |
| 5,515,508 A | 5/1996 | Pettus et al. | 709/203 |
| 5,522,026 A | 5/1996 | Records et al. | 715/710 |
| 5,539,659 A | 7/1996 | McKee et al. | 709/224 |
| 5,557,742 A | 9/1996 | Smaha et al. | 726/22 |
| 5,586,260 A | 12/1996 | Hu | 726/12 |
| 5,590,331 A | 12/1996 | Lewis et al. | 717/144 |
| 5,606,668 A | 2/1997 | Shwed | 726/13 |
| 5,623,600 A | 4/1997 | Ji et al. | 726/24 |
| 5,623,601 A | 4/1997 | Vu | 726/12 |
| 5,630,061 A | 5/1997 | Richter et al. | 709/227 |
| 5,649,095 A | 7/1997 | Cozza | 714/39 |
| 5,649,185 A | 7/1997 | Antognini et al. | 707/9 |
| 5,675,711 A | 10/1997 | Kephart et al. | 706/12 |
| 5,696,486 A | 12/1997 | Poliquin et al. | 340/506 |
| 5,696,822 A | 12/1997 | Nachenberg | 726/24 |
| 5,706,210 A | 1/1998 | Kumano et al. | 709/224 |
| 5,734,697 A | 3/1998 | Jabbarnezhad | 379/14.01 |
| 5,745,692 A | 4/1998 | Lohmann, II et al. | 709/223 |
| 5,748,098 A | 5/1998 | Grace | 370/242 |
| 5,761,504 A | 6/1998 | Corrigan et al. | 713/2 |
| 5,764,887 A | 6/1998 | Kells et al. | 726/14 |
| 5,764,890 A | 6/1998 | Glasser et al. | 726/11 |
| 5,765,030 A | 6/1998 | Nachenberg et al. | 714/33 |
| 5,774,727 A | 6/1998 | Walsh et al. | 717/150 |
| 5,787,177 A | 7/1998 | Leppek | 713/164 |
| 5,790,799 A | 8/1998 | Mogul | 709/224 |
| 5,796,942 A | 8/1998 | Esbensen | 726/13 |
| 5,798,706 A | 8/1998 | Kraemer et al. | 726/3 |
| 5,812,763 A | 9/1998 | Teng | 726/25 |
| 5,815,574 A | 9/1998 | Fortinsky | 713/153 |
| 5,822,517 A | 10/1998 | Dotan | 726/22 |
| 5,826,013 A | 10/1998 | Nachenberg | 726/22 |
| 5,828,833 A | 10/1998 | Belville et al. | 726/11 |
| 5,832,208 A | 11/1998 | Chen et al. | 726/24 |
| 5,832,211 A | 11/1998 | Blakley, III et al. | 726/6 |
| 5,835,726 A | 11/1998 | Shwed et al. | 709/229 |
| 5,838,903 A | 11/1998 | Blakely, III et al. | 726/5 |
| 5,842,002 A | 11/1998 | Schnurer et al. | 703/21 |
| 5,845,067 A | 12/1998 | Porter et al. | 726/4 |
| 5,848,233 A | 12/1998 | Radia et al. | 726/13 |
| 5,854,916 A | 12/1998 | Nachenberg | 703/21 |
| 5,857,191 A | 1/1999 | Blackwell, Jr. et al. | 707/10 |
| 5,864,665 A | 1/1999 | Tran | 726/10 |
| 5,864,803 A | 1/1999 | Nussbaum | 704/232 |
| 5,872,978 A | 2/1999 | Hoskins | 717/158 |
| 5,875,296 A | 2/1999 | Shi et al. | 726/5 |
| 5,878,420 A | 3/1999 | de la Salle | 707/10 |
| 5,881,236 A | 3/1999 | Dickey | 709/221 |
| 5,884,033 A | 3/1999 | Duvall et al. | 709/206 |
| 5,892,903 A | 4/1999 | Klaus | 726/25 |
| 5,899,999 A | 5/1999 | De Bonet | 707/104.1 |
| 5,907,834 A | 5/1999 | Kephart et al. | 706/20 |
| 5,919,257 A | 7/1999 | Trostle | 726/22 |
| 5,919,258 A | 7/1999 | Kayashima et al. | 726/23 |
| 5,922,051 A | 7/1999 | Sidey | 709/223 |
| 5,925,126 A | 7/1999 | Hsieh | 726/19 |
| 5,931,946 A | 8/1999 | Terada et al. | 726/25 |
| 5,940,591 A | 8/1999 | Boyle et al. | 726/3 |
| 5,950,012 A | 9/1999 | Shiell et al. | 717/169 |
| 5,961,644 A | 10/1999 | Kurtzberg et al. | 726/23 |
| 5,964,839 A | 10/1999 | Johnson et al. | 709/224 |
| 5,964,889 A | 10/1999 | Nachenberg | 714/25 |
| 5,974,237 A | 10/1999 | Shurmer et al. | 709/224 |
| 5,974,457 A | 10/1999 | Waclawsky et al. | 709/224 |
| 5,978,917 A * | 11/1999 | Chi | 713/201 |
| 5,983,270 A | 11/1999 | Abraham et al. | 709/224 |
| 5,983,348 A | 11/1999 | Ji | 726/13 |
| 5,983,350 A | 11/1999 | Minear et al. | 726/11 |
| 5,987,606 A | 11/1999 | Cirasole et al. | 726/11 |
| 5,987,610 A | 11/1999 | Franczek et al. | |
| 5,987,611 A | 11/1999 | Freund | 726/4 |
| 5,991,856 A | 11/1999 | Spilo et al. | 711/147 |
| 5,991,881 A | 11/1999 | Conklin et al. | 726/22 |
| 5,999,711 A | 12/1999 | Misra et al. | 726/4 |
| 5,999,723 A | 12/1999 | Nachenberg | |
| 6,003,132 A | 12/1999 | Mann | 726/24 |
| 6,006,016 A | 12/1999 | Faigon et al. | 714/48 |
| 6,009,467 A | 12/1999 | Ratcliff et al. | 709/224 |
| 6,014,645 A | 1/2000 | Cunningham | 705/38 |
| 6,016,553 A | 1/2000 | Schneider et al. | 714/21 |
| 6,021,510 A | 2/2000 | Nachenberg | 714/38 |
| 6,026,442 A | 2/2000 | Lewis et al. | 709/229 |
| 6,029,256 A | 2/2000 | Kouznetsov | 714/38 |
| 6,035,323 A | 3/2000 | Narayen et al. | 709/201 |
| 6,035,423 A | 3/2000 | Hodges et al. | 714/38 |
| 6,041,347 A | 3/2000 | Harsham et al. | 709/220 |
| 6,052,709 A | 4/2000 | Paul | 709/202 |
| 6,061,795 A | 5/2000 | Dircks et al. | 726/4 |
| 6,067,410 A | 5/2000 | Nachenberg | 703/28 |
| 6,070,190 A | 5/2000 | Reps et al. | 709/224 |
| 6,070,244 A | 5/2000 | Orchier et al. | 726/1 |
| 6,073,172 A | 6/2000 | Frailong et al. | 709/222 |
| 6,081,894 A | 6/2000 | Mann | 713/188 |
| 6,085,224 A | 7/2000 | Wagner | 709/203 |
| 6,088,803 A | 7/2000 | Tso et al. | 726/22 |
| 6,088,804 A | 7/2000 | Hill et al. | 726/25 |
| 6,092,194 A | 7/2000 | Touboul | 726/24 |
| 6,094,731 A | 7/2000 | Waldin et al. | 714/38 |
| 6,098,173 A | 8/2000 | Elgressy et al. | 726/17 |
| 6,104,783 A | 8/2000 | DeFino | 379/38 |
| 6,108,799 A | 8/2000 | Boulay et al. | 714/38 |
| 6,118,940 A | 9/2000 | Alexander, III et al. | 717/127 |
| 6,119,165 A | 9/2000 | Li et al. | 709/229 |
| 6,119,234 A | 9/2000 | Aziz et al. | 726/11 |
| 6,122,738 A | 9/2000 | Millard | 713/187 |
| 6,144,961 A | 11/2000 | de la Salle | 707/10 |
| 6,154,844 A | 11/2000 | Touboul et al. | 726/24 |
| 6,161,109 A | 12/2000 | Matamoros et al. | 707/203 |
| 6,167,520 A | 12/2000 | Touboul | 726/23 |
| 6,173,413 B1 | 1/2001 | Slaughter et al. | 714/6 |
| 6,185,689 B1 | 2/2001 | Todd, Sr. et al. | 726/25 |
| 6,195,687 B1 | 2/2001 | Greaves et al. | 709/228 |
| 6,199,181 B1 | 3/2001 | Rechef et al. | 714/38 |
| 6,205,552 B1 | 3/2001 | Fudge | 726/25 |
| 6,226,372 B1 | 5/2001 | Beebe et al. | 379/189 |
| 6,230,288 B1 | 5/2001 | Kuo et al. | 714/38 |
| 6,266,773 B1 | 7/2001 | Kisor et al. | 726/17 |
| 6,266,774 B1 | 7/2001 | Sampath et al. | 726/24 |
| 6,271,840 B1 | 8/2001 | Finseth et al. | 715/513 |
| 6,272,641 B1 | 8/2001 | Ji | 726/24 |
| 6,275,938 B1 | 8/2001 | Bond et al. | 726/23 |
| 6,275,942 B1 | 8/2001 | Bernhard et al. | 726/22 |
| 6,278,886 B1 | 8/2001 | Hwang | 455/566 |
| 6,279,113 B1 | 8/2001 | Vaidya | 726/23 |
| 6,282,546 B1 | 8/2001 | Gleichauf et al. | 707/102 |
| 6,298,445 B1 | 10/2001 | Shostack et al. | 726/25 |
| 6,301,668 B1 | 10/2001 | Gleichauf et al. | 726/25 |
| 6,314,520 B1 | 11/2001 | Schell et al. | 726/13 |
| 6,314,525 B1 | 11/2001 | Mahalingham et al. | 714/4 |
| 6,321,338 B1 | 11/2001 | Porras et al. | 726/25 |
| 6,324,627 B1 | 11/2001 | Kricheff et al. | 711/163 |
| 6,324,647 B1 | 11/2001 | Bowman-Amuah | 726/23 |
| 6,324,656 B1 | 11/2001 | Gleichauf et al. | 714/37 |
| 6,338,141 B1 | 1/2002 | Wells | 726/24 |
| 6,347,374 B1 | 2/2002 | Drake et al. | 726/1 |
| 6,353,385 B1 | 3/2002 | Molini et al. | 340/506 |
| 6,357,008 B1 | 3/2002 | Nachenberg | 726/24 |
| 6,377,994 B1 | 4/2002 | Ault et al. | 709/229 |
| 6,396,845 B1 | 5/2002 | Sugita | 370/449 |

| | | | |
|---|---|---|---|
| 6,397,242 B1 | 5/2002 | Devine et al. .................. 718/1 |
| 6,397,245 B1 | 5/2002 | Johnson, II et al. ........ 709/203 |
| 6,405,318 B1 | 6/2002 | Rowland ...................... 726/22 |
| 6,405,364 B1 | 6/2002 | Bowman-Amuah ......... 717/101 |
| 6,408,391 B1 | 6/2002 | Huff et al. ..................... 726/22 |
| 6,415,321 B1 | 7/2002 | Gleichauf et al. ........... 709/224 |
| 6,429,952 B1 | 8/2002 | Olbricht ...................... 358/442 |
| 6,434,615 B1 | 8/2002 | Dinh et al. .................. 709/224 |
| 6,438,600 B1 | 8/2002 | Greenfield et al. .......... 709/229 |
| 6,445,822 B1 | 9/2002 | Crill et al. .................... 382/218 |
| 6,453,345 B1 | 9/2002 | Trcka et al. ................. 709/224 |
| 6,453,346 B1 | 9/2002 | Garg et al. .................. 709/224 |
| 6,460,141 B1 | 10/2002 | Olden ............................ 726/4 |
| 6,463,426 B1 | 10/2002 | Lipson et al. ................... 707/3 |
| 6,470,449 B1 | 10/2002 | Blandford .................... 713/178 |
| 6,477,585 B1 | 11/2002 | Cohen et al. ................ 719/318 |
| 6,477,648 B1 | 11/2002 | Schell et al. ................... 726/22 |
| 6,477,651 B1 | 11/2002 | Teal ............................. 726/23 |
| 6,484,203 B1 | 11/2002 | Porras et al. ................ 709/224 |
| 6,487,666 B1 | 11/2002 | Shanklin et al. .............. 726/23 |
| 6,496,858 B1 | 12/2002 | Frailong et al. ............. 709/221 |
| 6,499,107 B1 | 12/2002 | Gleichauf et al. ............. 726/23 |
| 6,510,523 B1 | 1/2003 | Perlman et al. ................. 726/6 |
| 6,517,587 B1 | 2/2003 | Satyavolu et al. ........ 715/501.1 |
| 6,519,647 B1 | 2/2003 | Howard et al. .............. 709/229 |
| 6,519,703 B1 | 2/2003 | Joyce ........................... 726/22 |
| 6,530,024 B1 | 3/2003 | Proctor ........................ 726/23 |
| 6,535,227 B1 | 3/2003 | Fox et al. .................... 715/736 |
| 6,546,493 B1 | 4/2003 | Magdych et al. ............. 726/25 |
| 6,563,959 B1 | 5/2003 | Troyanker ................... 382/282 |
| 6,574,737 B1 | 6/2003 | Kingsford et al. ............ 726/25 |
| 6,578,147 B1 | 6/2003 | Shanklin et al. .............. 726/22 |
| 6,584,454 B1 | 6/2003 | Hummel, Jr. et al. ......... 705/59 |
| 6,601,190 B1 | 7/2003 | Meyer et al. ................. 714/37 |
| 6,606,744 B1 | 8/2003 | Mikurak ...................... 717/174 |
| 6,618,501 B1 | 9/2003 | Osawa et al. ............... 382/165 |
| 6,628,824 B1 | 9/2003 | Belanger ..................... 382/165 |
| 6,647,139 B1 | 11/2003 | Kunii et al. ................. 382/159 |
| 6,647,400 B1 | 11/2003 | Moran ........................ 707/205 |
| 6,661,904 B1 | 12/2003 | Sasich et al. ............... 382/100 |
| 6,668,082 B1 | 12/2003 | Davison et al. ............. 382/190 |
| 6,668,084 B1 | 12/2003 | Minami ...................... 382/215 |
| 6,681,331 B1 | 1/2004 | Munson et al. ............... 726/23 |
| 6,691,232 B1 | 2/2004 | Wood et al. .................... 726/6 |
| 6,704,874 B1 | 3/2004 | Porras et al. ................. 726/22 |
| 6,708,212 B1 | 3/2004 | Porras et al. ............... 709/224 |
| 6,711,127 B1 | 3/2004 | Gorman et al. ............. 370/230 |
| 6,711,615 B1 | 3/2004 | Porras et al. ............... 709/224 |
| 6,718,383 B1 | 4/2004 | Hebert ....................... 709/224 |
| 6,721,806 B1 | 4/2004 | Boyd et al. .................. 719/312 |
| 6,725,377 B1 | 4/2004 | Kouznetsov ................... 726/23 |
| 6,725,378 B1 | 4/2004 | Schuba et al. ................ 726/13 |
| 6,775,780 B1 | 8/2004 | Muttik ......................... 726/24 |
| 6,792,144 B1 | 9/2004 | Yan et al. .................... 382/190 |
| 6,792,546 B1 | 9/2004 | Shanklin et al. .............. 726/23 |
| 6,816,973 B1 | 11/2004 | Gleichauf et al. ............. 726/13 |
| 6,839,850 B1 | 1/2005 | Campbell et al. ............. 726/23 |
| 6,851,057 B1 * | 2/2005 | Nachenberg ................ 713/200 |
| 2001/0034847 A1 | 10/2001 | Gaul, Jr. ...................... 726/25 |
| 2002/0032717 A1 | 3/2002 | Malan et al. ................. 718/105 |
| 2002/0032793 A1 | 3/2002 | Malan et al. ................. 709/232 |
| 2002/0032880 A1 | 3/2002 | Poletto et al. .................. 714/4 |
| 2002/0035698 A1 | 3/2002 | Malan et al. .................. 726/23 |
| 2002/0083331 A1 | 6/2002 | Krumel ........................ 726/26 |
| 2002/0083334 A1 | 6/2002 | Rogers et al. |
| 2002/0138753 A1 | 9/2002 | Munson ....................... 726/26 |
| 2002/0144156 A1 | 10/2002 | Copeland, III ............... 726/22 |
| 2003/0037136 A1 | 2/2003 | Labovitz et al. ............. 709/224 |
| 2003/0088791 A1 | 5/2003 | Porras et al. ................... 726/4 |
| 2003/0212903 A1 | 11/2003 | Porras et al. ................. 726/13 |
| 2004/0010718 A1 | 1/2004 | Porras et al. ................. 726/23 |

FOREIGN PATENT DOCUMENTS

| | | |
|---|---|---|
| EP | 0 636 977 | 5/2001 |
| EP | 0 985 995 | 8/2003 |
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/054458 | 9/2000 |
| WO | WO 00/54458 | 9/2000 |
| WO | WO 01/84285 | 11/2001 |
| WO | WO 01/084285 | 11/2001 |
| WO | WO 02/06928 | 1/2002 |
| WO | WO 02/006928 | 1/2002 |
| WO | WO 02/056152 | 7/2002 |
| WO | WO 02/101516 | 12/2002 |

OTHER PUBLICATIONS

Custer, Helen, "Inside Windows NT", 1993, Microsoft Press.*
Duncan, Ray, "Advanced MS-DOS", 1986, Microsoft Pres.*
McDaniel, George, "IBM Dictionary of Computing", 1994, International Business Machines Corporation.*
Burd, Stephen D., "Systems Architecture", 1998, Course Technology, Second Edition.*
"Programmer's Guide PowerJ", 1997, Sybase.*
Baudouin Le Charlier, and Morton Swimmer, "Dynamic detection and classification of computer viruses using general behavior patterns", 1995, Proceedings of the Fifth International Virus Bulletin Conference,Boston.*
Le Charlier, Badouin; Swimmer, Morton; Mounji, Abdelaziz; "Dynamic Detection and Classification of Computer Viruses using General Behavior Patterns", 1995, Proceedings of the Fifth International Virus Bulletin Conference, Boston.*
Custer, Helen; "Inside Windows NT", 1993, Microsoft Press.*
"Advanced Virus Detection Technology for the Next Millennium," Aug. 1999, Network Associates, A Network Associates Executive White Paper, pp. 1-14.
"Enterprise-Grade Anti-Virus Automation in the 21st Century," Jun. 2000, Symantec, Technology Brief, pp. 1-17.
Jeffrey O. Kephart, et al., "Blueprint for a Computer Immune System," [online] 1997, Retrieved from Internet, URL: http://www.research.ibm.com/antivirus/SciPapers/Kephart/VB97/., pp. 1-15.
Baudouin Le Charlier, et al., "Dynamic Detection and Classification of Computer Viruses Using General Behavior Patters," 1995, Proceedings of the Fifth International Virus Bulletin Conference, Boston, pp. 1-22.
Robert Richardson, "Enterprise Antivirus Software," [online] Feb. 2000, Retrieved from Internet, URL: http://www.networkmagazine.com/article/NMG20000426S0006., pp. 1-6.
"Understanding and Managing Polymorphic Viruses," 1996, Symantec, The Symantec Enterprise Papers, vol. XXX, pp. 1-13.
Essex, David, E-Sleuths Make Net Safe for E-Commerce, Computerworld, Jun. 2000, pp. 1-2.
Newman, David, Intrusion Detection Systems, Data Communications, 1998, pp. 1-9.
International Search Report for PCT/US02/17161 of Dec. 31, 2002.
Hyland, et al., Concentric Supervision of Security Applications: A New Security Management Paradigm Computer Security Applications Conference, 1998, pp. 59-68.
Koilpillai et al., Recon-A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.
Mansouri-Samani et al., A Configurable Event Service for Distributed Systems Configurable Distributed Systems, 1996, pp. 210-217.
International Search Report for PCT/US01/13769 of Mar. 8, 2002.
Jagannathan et al., System Design Document: Next-Generation Intrusion Detection Expert Systems (NIDES), Internet Citation, Mar. 9, 1993, XP002136082, pp. 1-66.
Koilpillai, Adaptive Network Security Management, DARPA NGI PI Conference, Oct. 1998, pp. 1-27.
Hiverworld Continuous Adaptive Risk Management, Hiverworld, Inc., 1999-2000, pp. 1-14.
International Search Report for PCT/US02/04989of Sep. 19, 2002.
International Search Report for PCT/US02/02917 of Aug. 8, 2002.
NXI Communications, Inc., White Paper, NTS Security Issues, Oct. 15, 2001, pp. 1-12.
Mounji et al., Distributed Audit Trail Analysis, Proceedings of the Symposium of Network and Distributed System Security, San Diego, CA, Feb. 16-17, 1995, pp. 102-112.
Wobber et al., Authentication in the Taos Operating System, ACM Transactions on Computer Systems, vol. 12, No. 1, Feb. 1994, pp. 3-32.
Mayer et al., The Design of the Trusted Workstation: A True Infosec Product, 13th National Computer Security Conference, Washing, DC, Oct. 1-4, 1990, pp. 827-839.
Dawson, Intrusion Protection for Networks, Byte, Apr. 1995, pp. 171-172.
Buhkan, Checkpoint Charlie, PC Week Network, Nov. 27, 1995, pp. N1, N6-N7.
Process Software Technical Support Page, found on http://www.process.com/techsupport/whitesec.html, printed off of the Process Software website on Feb. 26, 2003, pp. 1-5.
Ganesan, BAfirewall: A Modern Firewall Design, Proceedings Internet Society Symposium on Network and Distributed System Security 1994, Internet Soc., 1994, pp. 99-108.
Lee, Trusted Systems, Chapter II-1-6 of Handbook of Information Security Management, Ed. Zella G. Ruthberg and Harold F. Tipton, Auerbach, Boston and New York, 1993, pp. 345-362.
Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.
Guha et al., Network Security via Reverse Engineering of TCP Code: Vulnerability Analysis and Proposed Solution, IEEE, Mar. 1996, pp. 603-610.
Garg et al., High Level Communication Primitives for Concurrent Systems, IEEE, 1988, pp. 92-99.
Hastings et al., TCP/IP Spoofing Fundamentals, IEEE, May 1996, pp. 218-224.
Snapp, Signature Analysis and Communication Issues in a Distributed Intrusion Detection System, Master Thesis, University of California, Davis, California, 1991, pp. 1-40.
Guha et al., Network Security via Reverse Engineering of TCP Code: Vulnerability Analysis and Proposed Solutions, IEEE, Jul. 1997, pp. 40-48.
Djahandari et al., An MBone for an Application Gateway Firewall, IEEE, Nov. 1997, pp. 72-81.
Kim et al., Implementing a Secure Login Environment: A Case Study of Using a Secure Network Layer Protocol, Department of Computer Science, University of Alabama, Jun. 1995, pp. 1-9.
Satyanarayanan, Integrating Security in a Large Distributed System, Acm Transaction on Computer Systems, vol. 7, No. 3, Aug. 1989, pp. 47-280.
Sammons, Nathaniel, "Multi-platform Interrogation and Reporting with Rscan," The Ninth Systems Administration Conference, LISA 1995, Monterrey, California, Sep. 17-22, 1995, pp. 75-87.
Dean et al., "Java Security: From HotJava to Netscape and Beyond," Proceedings of the 1996 IEEE Symposium on Security and Privacy, May 6-8, 1996, Oakland, California, pp. 190-200.
Fisch et al., "The Design of an Audit Trail Analysis Tool," Proceedings of the 10th Annual Computer Security Applications Conference, Dec. 5-9. 1994, Orlando, Florida, pp. 126-132.

Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.
Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.
Casella, Karen A., "Security Administration in an Open Networking Environment," The Ninth Systems Administration Conference, LISA 1995, Monterrey, California, Sep. 17-22, 1995, pp. 67-73.
Burchell, Jonathan, "Vi-SPY: Universal NIM?" Virus Bulletin, Jan. 1995, pp. 20-22.
Benzel et al., "Identification of Subjects and Objects in a Trusted Extensible Client Server Architecture," 18th National Information Systems Security Conference, Oct. 10-13, 1995, Baltimore, Maryland, pp. 83-99.
Epstein et al., "Component Architectures for Trusted Netware," 18th National Information Systems Security Conference, Oct. 10-13, 1995, Baltimore, Maryland, pp. 455-463.
Varadharajan, Vijay, "Design and Management of a Secure Networked Administration System: A Practical Approach," 19th National Information Systems Security Conference, Oct. 22-25, 1996, Baltimore, Maryland, pp. 570-580.
Snapp et al., "DIDS (Distributed Intrusion Detection System)—Motivation, Architecture, and An Early Prototype," 14th National Computer Security Conference, Oct. 1-4, 1991, Washington, DC, pp. 167-176.
Broner et al., "IntelligentI/O Rule-Based Input/Output Processing for Operating Systems," Operating Systems Review, vol. 25, No. 3, Jul. 1991, pp. 10-26.
Drews et al., "Special Delivery—Automatic Software Distribution Can Make You A Hero," Network Computing, Aug. 1, 1994, pp. 80, 82-86, 89, 91-95.
Morrissey, Peter, "Walls," Network Computing, Feb. 15, 1996, pp. 55-59, 65-67.
Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.
Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.
Anderson, Paul, "Towards a High-Level Machine Configuration System," Proceedings of the Eighth Systems Administration Conference (LISA VIII), Sep. 19-23, 1994, San Diego, California, pp. 19-26.
Cooper, Michael A., "Overhauling Rdist for the '90s," Proceedings of the Sixth Systems Administration Conference (LISA VI), Oct. 19-23, 1992, Long Beach, California, pp. 175-188.
Vangala et al., "Software Distribution and Management in a Networked Environment," Proceedings of the Sixth Systems Administration Conference, Oct. 19-23, 1992, Long Beach, California, pp. 163-170.
Kim et al., "The Design and Implementation of Tripwire: A File System Integrity Checker," 2nd ACM Conference on Computer and Communications Security, Nov. 2-4, 1994, Fairfax, Virginia, pp. 18-29.
Winn Schwartau, "e.Security™-Solving 'Dumb Days' With Security Visualization," e-Security, Inc., Naples, FL 34103, 2000.
Anita D'Amico, Ph.D., "Assessment of Open e-Security Platform™: Vendor-Independent Central Management of Computer Security Resources," Applied Visions, Inc., 1999.
"e.Security™-Open Enterprise Security Management: Delivering an integrated, automated, centrally Managed Solution You Can Leverage Today and Tomorrow," e-Security, Inc., Naples, FL 34102, 1999.
"e.Security™-Vision," e-Security, Inc., Naples, FL, 1999.
"e.Security™-Administrator Workbench™," e-Security, Inc. Naples, FL, 1999.
"e.Security™-Fact Sheet," e-Security, Inc., Naples,FL, 1999.

"e.Security™-Open e-Security Platform™," e-Security, Inc. Naples, FL, 1999.

Babcock, "E-Security Tackles The Enterprise," Jul. 28, 1999; Inter@ctive Week, www.Zdnet.com.

Kay Blough, "In Search of More-Secure Extranets," Nov. 1, 1999, www.InformationWeek.com.

Paul H. Desmond, "Making Sense of Your Security Tools," Software Magazine and Wiesner Publishing, www.softwaremag.com, 1999.

Kay Blough, "Extra Steps Can Protect Extranets," Nov. 1, 1999, www.InformationWeek.com.

Sean Hao, "Software protects e-commerce—e-Security's product alerts networks when hackers attack," Florida Today, Florida.

Scott Weiss, "Security Strategies—E-Security, Inc.," product brief, Hurwitz Group, Inc., Mar. 24, 2000.

Sean Adee, CISA, "Managed Risk, Enhanced Response -The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

e.Security—"Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions," Apr. 3, 2000, Post-Newsweek Business Information, Inc., www.gcn.com.

e.Security™ , website pages (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom.

Gibson Research Corporation Web Pages, Shields Up!—Internet Connection Security Analysis, grc.com/default.htm, Laguna Hills, California, 2000.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Lee et al., A Generic Virus Detection Agent on the Internet, IEEE, 30th Annual Hawaii International Conference on System Sciences, 1997, vol. 4.

Cutler, Inside Windows NT, 1993, Microsoft Press.

Duncan, Advanced MS-Dos, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millennium, Aug. 1999, Network Associates, A Network Associates Executive White Paper, pp. 1-14.

Enterprise-Grade Anti-Virus Automation in the 21st Century, Jun. 2000, Symantec, Technology Brief, pp. 1-17.

Kephart et al., Blueprint for a Computer Immune System, 1997, Retrieved from Internet, URL: http//www.research.ibm.com/antivirus/scipapers/kephart/VB97, pp. 1-15.

Richardson, Enterprise Antivirus Software, Feb. 2000, Retrieved from Internet, URL: http://www.networkmagazine.com/article/nmg20000426S0006, pp. 1-6.

Understanding and Managing Polymorphic Viruses, 1996, Symantec, The Symantec Enterprise Papers, vol. XXX, pp. 1-13.

Gong, JavaTM Security Architecture (JDK1.2), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings, 3rd International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsoft.com/archive/default.asp?url=/archive/en-us/dnarvc/html/msdn_c7pcode2.asp, pp. 1-6, Apr. 1992.

DJGPP COFF Spec, http://delorie.com/djgpp/doc/coff/, pp. 1-15, Oct. 1996.

Natvig, Sandbox Technology Inside AV Scanners, Virus Bulletin Conference, Sep. 2001, pp. 475-488.

Norman introduces a new technique for eliminating new computer viruses, found on Norman's website, file://c:/documents%20and%20settings\7489\local%20settings\temporary%20internet%20files\olk, pp. 1-2, published Oct. 25, 2001, printed from website Dec. 27, 2002.

International Search Report for PCT/US01/19142 of Jan. 17, 2003.

Using the CamNet FAQ, http://www.cam.net.uk\manuals\bbsfaq\bbsfaq.htm, Jan. 17, 1997.

Express Storehouse Ordering System, "Accessing ESOS through the Network", http://www-bfs.ucsd.edu/mss/esos/man3.htm, Sep. 3, 1996.

Nasire, NASIRC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net/html, Mar. 20, 1997.

Sundaram, An Introduction to Intrusion Detection, Copyright 1996, published at www.acm.org/crossroads/xrds2-4/intrus.html, pp. 1-12.

Samfat, IDAMN: An Intrusion Detection Architecture for Mobile Networks, IEEE Journal on Selected Areas in Communications, vol. 15, No. 7, Sep. 1997, pp. 1373-1380.

INFO: Visual Basic Supports P-Code and Native Code Compilation (Q229415), http://support.micorsoft.com/support/kb/articles/Q229/4/15.ASP, pp. 1-2, Apr. 28, 1999.

International Search Report for PCT/US99/29117 of May 2, 2000.

Nordin, U of MN OIT Security and Assurance, Feb. 9, 2000.

Internet Security Systems, RealSecure SiteProtector, SAFEsuite Decisions to SiteProtector Migration, Aug. 8, 2003, pp. 1-42.

Internet Security Systems, SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Network World Fusion, http://www.nwfusion.com/cgi-bin/mailto/x/cgi, Apr. 21, 1999, p. 1-2.

NetworkICE Corporation, Can You Explain How Your Product Can Protect a Remote User with a VPN Client?, 1998-1999, pp. 1-2, http://www.webarchive.org/web/20000304071415/advice. networkice.com/advice/support/kb/q000003/default.

Yasin, Start-Up Puts Network Intruders on Ice, http://www.internetweek.com/story/INW19990505S0001, May 5, 1999, pp. 1-2.

Morency, NetworkWorldFusion, http://nwfusion.com/cgi-bin/mailto/x.cgi, Jun, 28, 1999, pp. 1-2.

Rogers, Network ICE Touts Security Wares, Apr. 23, 1999, San Mateo, California, http://www.crn.com/showArticle.jhtml?articleID=18829106&flatPage=true, pp. 1-2.

Rogers, Network ICE Signs Resellers, May 26, 1999, San Mateo, California, http://www.crn.com/showArticle.jhtml?articleID=18805302&flatPage=true, pp. 1-2.

Internet Security Systems, I've Been Attacked! Now What?, Aug. 27, 1999, http://www.iss.net/security_center/advice/Support/KB/q000033/default.htm, pp. 1-2.

Internet Security Systems, What is the Format of "Attack-List.CSV"?, Aug. 21, 1999, http://www.iss.net/security_center/advice/Support/KB/q000018/default.htm, pp. 1-2.

Neumann et al., Experience with Emerald to Date, Apr. 11-12, 1999, 1st USENIX Workshop on Intrusion Detection and Network Monitoring, Santa Clara, California, pp. 1-9.

Lindqvist et al., Detecting Computer and Network Misuse Through the Production-Based Expert System Toolkit (P-BEST), May 9-12, 1999, Proceedings of the 1999 IEEE Symposium on Security and Privacy, Oakland, California, pp. 1-16.

Kendall, A Database of Computer Attacks for the Evaluation of Intrusion Detection Systems, Jun. 1999, Department of Defense Advanced Research Projects Agency, pp. 1-124.

Neumann, Computer Security and the U.S. Infrastructure, Nov. 6, 1997, Congressional Testimony, pp. 1-11.

Porras et al., Life Traffic Analysis of TCP/IP Gateways, Nov. 10, 1997, Internet Society's Networks and Distributed Systems Security Systems Symposium, Mar. 1998, http://www.sdl.sri.com/projects/emerald/live-traffic.html, pp. 1-16.

Raynaud et al., Integrated Network Management IV, 1995, Proceedings of the 4th International Symposium on Integrated Network Management, pp. 1-2 and 5-16.

Heberlein et al., A Method to Detect Intrusive Activity in a Networked Environment, Oct. 1-4, 1991, 14th National Computer Security Conference, Washington, D.C., pp. 362-363 and 365-371.

Ko et al., Execution Monitoring of Security-Critical Programs in Distributed Systems: A Specification-Based Approach, 1997, Proceedings of the 1997 IEEE Symposium on Security and Privacy, pp. 175-187.

Crosbie et al., Active Defense of a Computer System Using Autonomous Agents, Technical Report No. 95-008, Feb. 15, 1995, Purdue University, West Lafayette, Indiana, pp. 1-14.

Mansouri-Samani et al., Monitoring Distributed Systems, Nov. 1993, IEEE Network, pp. 20-30.

Jakobson et al., Alarm Correlation, Nov. 1993, IEEE Network, pp. 52-59.

Anderson et al., Next-Generation Intrusion Detection Expert (NIDES), A Summary, May 1995, SRI International, pp. 1-37.

Veritas Software, Press Release, Robust Enhancements in Version 6.0 Maintain Seagate WI as the De Facto Standard for Software Distribution, Oct. 6, 1997, Press Releases, pp. 1-4, http://216.239.39.104/search?q=cache:HS9kmKlm2QoJ:www.veritas.com/us/aboutus/pressroom/199.....

Yasin, Network-Based IDS are About to Stop Crying Wolf, Security Mandata: Silence False Alarms, Apr. 9, 1999, http://lists.jammed.com/ISN/1999/04/0021.html, pp. 1-3.

Internet Security Systems, Press Release, ISS Reports Record Revenues and Net Income for Second Quarter, Jul. 19, 1999, http://bvlive01.iss.net/issEn/delivery/prdetail.jsp?type=Financial&oid=14515, pp. 1-5.

LaPadula, State of the Art in CyberSecurity Monitoring, A Supplement, Sep. 2001, Mitre Corporation, pp. 1-15.

Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.

Crosbie et al., Active Defense of a Computer System Using Autonomous Agents, Feb. 15, 1995, Technical Report No. 95-008, Purdue University, West Lafayette, Indiana, pp. 1-14.

Crosbie et al., Defending a Computer System Using Autonomous Agents, Mar. 11, 1994, Technical Report No. 95-022, Purdue University, West Lafayette, Indiana, pp. 1-11.

Denning, An Intrusion-Detection Model, Feb. 1987, IEEE Transactions on Software Engineering, vol. SE-13, No. 2, pp. 1-17.

Lunt, A Survey of Intrusion Detection Techniques, 1993, Computers & Security, 12 (1993), pp. 405-418.

Porras et al., Penetration State Transition Analysis A Rule-Based Intrusion Detection Approach, 1992, pp. 220-229.

Javitz et al., The NIDES Statistical Component: Description and Justification, SRI International, Menlo Park, California, SRI Project 3131, Mar. 7, 1994.

Lindqvist et al., Detecting Computer and Network Misuses Through the Production-Based Expert System Toolset (P-BEST), Oct. 25, 1998, pp. 1-20.

Javitz et al., The SRI IDES Statistical Anomaly Detector, SRI Internationa, Menlo Park, California, May 1991, IEEE Symposium on Security and Privacy, pp. 1-11.

Porras et al., Live Traffic Analysis of TCP/IP Gateways, Nov. 10, 1997, SRI International, Menlo Park, California, pp. 1-16.

Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.

Information & Computing Sciences: System Design Laboratory: Programs: Intrusion Detection, SRI International, http://www.sdl.sri.com/programs/intrusion/, Jun. 17, 2004, pp. 1-2.

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.

Almgren et al., Application-Integrated Data Collection for Security Monitoring, Oct. 10-12, 2001, SRI International, Menlo Park, California, pp. 1-15.

Debar et al., Research Report: A Revised Taxonomy for Intrusion-Detection Systems, Oct. 25, 1999, IBM Research, Switzerland, pp. 1-23.

Porras et al., Emerald: Event Monitoring Enabling Responses to Anomalous Live Disturbances, Computer Science Laboratory, SRI International, Menlo Park, CA, Dec. 18, 1996, pp. 1-3.

Frequently-Asked Questions about RealSecure, pp. 1-14, http://web.archive.org/web/19970721183227/iss.net/prod/rs_faq.html, May 30, 1997.

Cisco Systems, Inc., Empowering the Internet Generation, 1998.

Internet Security Systems, Inc., RealSecure Release 1.2 for UNIX, A User Guide and Reference Manual, 1997.

Internet Security Systems, Inc., Real-time attack recognition and response: A solution for tightening network security, Jan. 1997, pp. 1-13.

Internet Security Systems, Inc., SAFEsuite Decisions User Guide, Version 1.0, 1998, pp. 1-78.

NetworkICE Corporation, ICEcap Administrator's Guide, Version 1.0 BETA, 1999, pp. 1-142.

Debar, Herve et al., A Neural Network Component for an Intrusion Detection System, 1992, pp. 240-250.

SRI International, A Prototype IDES: A Real-Time Intrusion-Detection Expert System, Aug. 1987, p. 1-63.

SRI International, Requirements and Model for IDES-A Real-Time Intrusion-Detection Expert System, Aug. 1985, pp. 1-70.

SRI International, An Intrusion-Detection Model, Nov. 1985, pp. 1-29.
Dowell et al., The ComputerWatch Data Reduction Tool, Proc. of the 13th National Computer Security Conference, Washington, D.C., Oct. 1990, pp. 99-108.
Fox et al., A Neural Network Approach Towards Intrusion Detection, Jul. 2, 1990, pp. 125-134.
Garvey et al., Model-Based Intrusion Detection, Oct. 1991, pp. 1-14.
Ilgun et al., State Transition Analysis: A Rule-Based Intrusion Detection Approach, Mar. 1995, pp. 188-199.
Javitz et al., The SRI IDES Statistical Anomaly Detector, May 1991, pp. 1-11.
SRI International, The NIDES Statistical Component Description and Justification, Mar. 7, 1994, pp. 1-46.
Karen, Oliver, PC Magazine, The Digital Doorman, Nov. 16, 1999, p. 68.
Liepins et al., Anomaly Detection: Purpose and Frameowrk, 1989, pp. 495-504.
Lindqvist et al., Detecting Computer and Network Misuse Through the Production-Bases Expert System Toolset (P-BEST), Oct. 25, 1998, pp. 1-20.
Lunt, Teresa, A survey of intrusion detection techniques, 1993, pp. 405-418.
Lunt, Teresa, Automated Audit Trail Analysis and Intrusion Detection: A Survey, Oct. 1988, pp. 1-8.
Porras et al., Penetration State Transition Analysis A Rule-Based Intrusion Detection Approach, 1992, pp. 220-229.
Sebring et al., Expert Systems in Intrusion Detection: A Case Study, Oct. 1988, pp. 74-81.
Shieh et al., A Pattern-Oriented Intrusion-Detection Model and Its Applications, 1991, pp. 327-342.
Smaha, Stephen, Haystack: An Intrusion Detection System, 1988.
Snapp, Steven Ray, Signature Analysis and Communication Issues in a Distributed Intrusion Detection System, 1991, pp. 1-40.
Porras et al., EMERALD: Event Monitoring Enabling Responses to Anomalous Live Disturbances, Oct. 1997, pp. 353-365.
Lunt et al., Knowledge-Based Intrusion Detection, Mar. 1989, pp. 102-107.
Lunt et al., An Expert System to Classify and Sanitize Text, Dec. 1987, pp. 1-5.
Tener, William, Computer Security in the Age of Information, AI & 4GL: Automated Detection and Investigation Tools, 1989, pp. 23-29.
Teng et al., Adaptive Real-time Anomaly Detection Using Inductively Generated Sequential Patterns, 1990, pp. 278-284.
Vaccaro et al., Detection of Anomalous Computer Session Activity, 1989, pp. 280-289.
Winkler, J.R., A UNIX Prototype for Intrusion and Anomaly Detection in Secure Networks, 1990, pp. 115-124.
Boyen et al. Tractable Inference for Complex Stochastic Process, Jul. 24-26, 1998.
Copeland, Observing Network Traffic—Techniques to Sort Out the Good, the Bad, and the Ugly, 2000, pp. 1-7.
Goan, Terrance, Communications of the ACM, A Cop on the Beat Collecting and Appraising Intrusion Evidence, Jul. 1999, pp. 47-52.
Heberlein et al., A network Security Monitor, 1990, pp. 296-304.
Jackson et al., An Expert System Applications for Network Intrusion Detection, Oct. 1991, pp. 1-8.
Lankewicz et al., Real-Time Anomaly Detection Using a Nonparametric Pattern Recognition Approach, 1991, pp. 80-89.
Lippmann et al., Evaluating Intrusion Detection Systems: The 1998 DARPA Off-line Intrusion Detection Evaluation, 1999.
Munson et al., Watcher: The Missing Piece of the Security Puzzle, Dec. 2001.
Pearl, Judea, Probabilistic Reasoning in Intelligent Systems: Networks of Plausible Inference, Sep. 1988.
Porras et al., Live Traffic Analysis of TCP/IP Gateways, Dec. 12, 1997, pp. 1-13.
EMERALD TCP Statitical Analyzer 1998 Evaluation Results, http://www.sdl.sri.com/projects/emerald/98-eval-estat/index.html, Jul. 9, 1999, pp. 1-15.
Staniford-Chen, GrIDS-A Graph Based Intrusion Detection System for Large Networks, Oct. 1996.
Tener, William, Discovery: An Expert System in the Commercial Data Security Environment, Dec. 1986, pp. 45-53.
Valdes et al., Adaptive, Model-Based Monitoring for Cyber Attack Detection, 2000, pp. 1-19.
SRI International, Blue Sensors, Sensor Correlation, and Alert Fusion, Oct. 4, 2000.
Valdes et al., Statistical Methods for Computer Usage Anomaly Detection Using NIDES, Jan. 27, 1995, pp. 306-311.
Wimer, Scott, The Core of CylantSecure, http://www.cylant.com/products/core.html, 1999, pp. 1-4.
Zhang et al., A Hierarchical Anomaly Network Intrusion Detection System using Neural Network Classification, Feb. 2001.
Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.
Linux Weekly News, http://lwn.net/1998/0910shadow.html, Sep. 8, 1998, pp. 1-38.
Cracker Tracking: Tighter Security with Intrucsion Detection, http://www.bvte.com/art/9805/sec20/art1.htm, May 1998, pp. 1-8.
Cisco Systems, Inc., Newtork RS: Intrusion Detection and Scanning with Active Audit Session 1305, 1998.
Business Security Advisor Magazine, Intrusion Detection Systems: What You Need to Know, http://advisor.com/doc/0527, Sep. 1998, pp. 1-7.
Garvey et al., An Inference Technique for Integrating Knowledge from Disparate Sources, Multisensor Integration and Fusion for Intelligenct Machines and Systems, 1995, pp. 458-464.
Power et al., CSI Intrusion Detection System Resource, Jul. 1998, pp. 1-7.
Cisco Systems, Inc., NetRanger User's Guide Version 2.1.1, 1998.
Internet Security Systems, Real-Time Attack Recognition and Response: A Solution for Tightening Network Security, http://www.iss.net, 1997, pp. 1-13.
Network ICE Corporation, Network ICE Product Documentation, pp. 1-3, http://www.web.archive.org/web/20011005080013/www.networkice.com/support/documentation.html, Jul. 6, 2004.
Network ICE Corporation, Network ICE Documentation, p. 1, http://www.web.archive.org/web/19991109050852/www.networkice.com/support/docs.htm, Jul. 6, 2004.
Network ICE Corporation, Network ICE Press Releases, p. 1, http://www.web.archive.org/web/19990903214428/www.netice.com/company/pressrelease/press.htm, Jul. 7, 2004.
Network ICE Corporation, Network ICE Press Releases, p. 1, http://www.web.archive.org/web/20000304074934/www.netice.com/company/pressrelease/press.htm, Jul. 7, 2004.
Brentano et al., An Architecture for Distributed Intrusion Detection System, Department of Energy Computer Security Group, 14th Annual Conference Proceedings, pp. (17)25-17(45), May 1991.
Staniford-Chen et al., GrIDS-A Graph Based Intrusion Detection System for Large Networks, University of California, Davis, California, 19th National Information Systems Security Conference, 1996, pp. 1-10.
Ricciulli et al., Modeling Correlated Alarms in Network Management Systems, SRI International, Menlo Park, California, , Proceedings of the Conference on Communication Networks and Distributed System Modeling and Simulation, 1997, pp. 1-8.
Porras et al., Emerald: Event Monitoring Enabling Responses to Anomalous Live Disturbances, SRI International, Menlo Park, California, 20th National Information Systems Security Conference, Oct. 1997, pp. 1-24.
Porras et al., A Mission-Impact Based Approach to INFOSEC Alarm Correlation, SRI International, Menlo Park, California, Oct. 2002, pp. 1-33.
Phrack 55 Download (234 kb, Sep. 9, 1999), http://www.phrack.org/show.php?p=55&a=9, pp. 1-6.
Porras et al., A Mission-Impact-Based Approach to INFOSEC Alarm Correlation, SRI International, Menlo Park, California, Oct. 2002, pp. 1-19.
Bace, An Introduction to Intrusion Detection and Assessment for System and Network Security Management, 1999, pp. 1-38.

Hunteman, Automated Information System—(AIS) Alarm System, University of California, Los Alamos National Laboratory, 20th National Information System Security Conference, Oct. 1997, pp. 1-12.
Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.
Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b... .
Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.
Lunt et al., Knowledge-Based Intrusion Detection, SRI International, Menlo Park, California, Conference on AI Systems in Government, Washington, D.C., Mar. 1989, pp. 102-107.
A. Information Assurance BAA 98-34 Cover Sheet, SRI International, Nov. 1, 2000, pp. 2-35.
NetScreen Products, FAQ, http://www.netscreen.com/products/faq.html, Feb. 28, 2003, pp. 1-6.
Miller, A Network Under Attack: Leverage Your Existing Instrumentation to Recognize and Respond to Hacker Attacks, NetScout Systems, Westford, MA, Apr. 2003, pp. 1-8.
Technology Brief: Intrusion Detection for the Millennium, Internet Security Systems, 2000, pp. 1-6.
Weiss et al., Analysis of Audit and Protocol Data using Methods from Artificial Intelligence, Siemens AG, Munich, Germany, Proc. of the 13th National Computer Security Conference, Washington, D.C., Oct. 1990, pp. 109-114.
Snapp et al., DIDS (Distributed Intrusion Detection System)—Motivation, Architecture, and an Early Protype), University of California, Davis California, , Proc. 14th National Computer Security Conference, Washington, D.C., Oct. 1991, pp. 167-176.
Internet Security Systems, Inc., SAFEsuite Interprise Edition, Project "Gatekeeper" 1.0, Market Requirements Document, Mar. 30, 1998, pp. 1-12.
Internet Security Systems, SAFEsuite Decisions, 2000, pp. 1-2.
Internet Security Systems, Dynamic Threat Protection, Presse-Roundtable, Munich, Germany, Apr. 10, 2003, pp. 1-63.
Internet Security Systems, Preliminary ODM 1.0 Functional Specification, Aug. 1997, pp. 1-7.
Internet Security Systems, Inc., Scanner-ISSDK Interface, Design Specification, Jun. 2, 2000, Draft 1.07, pp. 1-7.
RealSecure, Adaptive Network Security Manager Module Programmer's Reference Manual, pp. 1-84.
Advanced Concept Technology Demonstrations (ACTD), 2005, pp. 1-28.
Frank, Sounding the Alarm, Sep. 6, 1999, Federal Computer Week, pp. 1-2.
Crumb, Intrusion Detection Systems to be Integrated at AFRL, Air Force Research Laboratory, News@AFRL, Fall 1999, pp. 1.
Temin, Case Study: The IA: AIDE System at Two, 15th Annual Computer Security Applications Conference, Dec. 6-10, 1999, Phoenix, Arizona, pp. 1-26.
Spink, Automated Intrusion Detection Environment (AIDE), Intrusion Detection Sensor Fusion, Sep. 7, 1999, pp. 1-25.
Frincke et al., A Framework for Cooperative Intrusion Detection, 21st National Information Systems Security Conference, Oct. 6-9, 1998, Crystal City, Virginia, pp. 1-20.
Anderson et al., In Athena's Camp: Preparing for Conflict in the Information Age, An Exploration of Cyberspace Security R&D Investment Strategies for DARPA: The Day After-in Cyberspace II, Chaper Eleven, 1996, pp. 253-271.
Valdes et al., SRI International, Probabilistic Alert Correlation, 2001, pp. 1-15.
Bass, Multisensor Data Fusion for Next Generation Distributed Intrusion Detection Systems, Apr. 28, 1999, Iris National Symposium, pp. 1-6.
Perrochon et al., Enlisting Event Patterns for Cyber Battlefield Awareness, No Date, Stanford University, pp. 1-12.
Perrochon, Using Context-Based Correlation in Network Operations and Management, Jul. 2, 1999, Stanford University, pp. 1-20.
Perrochon, Real Time Event Based Analysis of Complex Systems, Jun. 1998, pp. 1-9.
Luckham et al., Complex Event Processing in Distributed Systems, Aug. 18, 1988, Stanford University, pp. 1-26.
Pettigrew, US Southcom United States Southern Command's Information Sharing Projects, Summer 1999, IAnewsletter, vol. 3, No. 1, pp. 1-24.
Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.
Cheung et al., The Design of GrIDS: A Graph-Based Intrusion Detection System, Jan. 26, 1999, University of California, pp. 1-51.
Cohen et al., Report of the Reporting and Analysis Track, Detection of Malicious Code, Intrusions, and Anomalous Activities Workshop, Feb. 22-23, 1999, pp. 1-47.
Garofalakis et al., Network Mining and Analysis: The Nemesis Project, Bell Labs, Lucent Technologies, No Date, pp. 1-12.
RealSecure ICEcap Manager User Guide Version 3.6, Internet Security Systems, Inc., 1998-2002, pp. 1-228.
Cuppens, Cooperative Intrusion Detection, Date Unknown, pp. 1-10.
Mukherjee et al., Network Intrusion Detection, IEEE Network, May/Jun. 1994, pp. 26-41.
Machlis, Net Monitoring Tools Gain Real-Time Alerts, Apr. 14, 1997, http://www.computerworld.com, pp. 1-12.
OmniGuard/ITA Intruder Alert, AXENT Technologies, Inc., Nov. 17, 2004, http://www.web.archive.org, pp. 1-10.
NetRanger Overview, Chapter 1, Date Unknown, pp. 1-16.
Sutterfield, Large-Scale Network Intrusion Detection, 1997, WheelGroup Corporation, pp. 1-10.
Kumar et al., An Application of Pattern Matching in Intrusion Detection, Technical Report No. CSD-TR-94-013, Jun. 17, 1994, Purdue University, pp. 1-55.
Huang et al., A Large-Scale Distributed Intrusion Detection Framework Based on Attack Strategy Analysis, Date Unknown, The Boeing Company, pp. 1-12.
Perrochon et al., Event Mining with Event Processing Networks, Date Unknown, Stanford University, pp. 1-4.
Gruschke, Integrated Event Management: Event Correlation Using Dependency Graphs, presented at DSOM 1998, University of Munich, pp. 1-12.
Bass, Intrusion Detection System and Multisensor Data Fusion, Apr. 2000, Communications of the ACM, vol. 43, No. 4, pp. 99-105.
Bass et al., A Glimpse into the Future of ID, Date Unknown, Usenix, pp. 1-10.
LaPadula, State of the Art in Anomaly Detection and Reaction, Jul. 1999, Mitre Corporation, pp. 1-36.
Rationalizing Security Events with Three Dimensions of Correlation, Date Unknown, NetForensics, Tech Brief, pp. 1-6.
Jou et al., Design and Implementation of a Scalable Intrusion Detection System for the Protection of Network Infrastructure, Date Unknown, MCNC, pp. 1-15.
Caldwell, Event Correlation: Security's Holy Grail?, Aug. 1, 2002, GuardedNet, pp. 1-21.
Metcalf et al., Intrusion Detection System Requirements, Sep. 2000, Mitre Corporation, pp. 1-33.
Jou et al., Architecture Design of a Scalable Intrusion Detection System for the Emerging Network Infrastructure, Technical Report CDRL A005, Apr. 1997, MCNC, pp. 1-42.
Security Manager for UNIX Systems Version 3.2.1 User's Guide, Feb. 1998, Internet Security Systems, pp. 1-162.
RealSecure Release 1.2 for UNIX A User Guide and Reference Manual, 1997, Internet Security Systems, Inc., pp. 1-92.
Internet Scanner 3.3 User Guide and Reference Manual, 1996, Internet Security Systems, Inc., pp. 1-119.
Landwehr et al., Newsletter of the IEEE Computer Society's TC on Security and Privacy Electronics, Electronic CIPHER, Nov. 25, 1997, Issue 25, pp. 1-34.
20th National Information Systems Security Conference, Oct. 6-10, 1997, Baltimore, Maryland, pp. 1-44.

EMERALD Alert Management Interface User's Guide Version 1.2, Dec. 6, 2000, SRI International, pp. 1-11.

Anderson et al., Detecting Unusual Program Behavior Using the Statistical Component of the Next-Generation Intrusion Detection Expert System (NIDES), May 1995, SRI International, pp. 1-89.

Lunt et al., Detecting Intruders in Computer Systems, 1993 Conference on Auditing and Computer Technology, SRI International, pp. 1-17.

Forlanda, The Secrets to Driving on BlackICE, Jan. 12, 2000, Network ICE, pp. 1-35.

BlackICE User's Guide Version 1.0 Beta Draft, 1999, Network ICE Corporation, pp. 1-59.

ICEcap Administrator's Guide Version 1.0 Beta Draft, 1999, Network ICE Corporation, pp. 1-25.

Shulak et al., ICEcap Advanced Administration Guide Version 3.0, 2001, Internet Security Systems Corporation, pp. 1-51.

"Real Secure, OS Sensor User Guide," Version 5.0, © Internet Security Systems, Inc. 199?-2000; Sep. 2000, pp. 1-64.

"Real Secure, User's Guide," Version 3.0, © 1992-1998, Internet Security Systems, Inc., pp. 1-128.

"System Security Scanner, User Guide," Version 1.6, © 1996-1998, Internet Security Systems, Inc., pp. 1-164.

"Real Secure™, Network Engine User Guide," Version 3.2.1, © 1999 by Internet Security Systems, Inc., pp. 1-38.

"Real Secure™, User Guide," Version 3.2.1, © 1999 by Internet Security Systems, Inc., pp. 1-38.

"Real Secure™, Manager for HP OpenView User Guide," Version 1.3, © 1999 by Internet Security Systems, Inc., pp. 1-48.

"Database Scanner, User Guide," Version 2.0, © 1992-1999, Internet Security Systems, Inc., pp. 1-112.

"Database Scanner™, User Guide," Version 4.0, © 2000 by Internet Security Systems, Inc., pp. 1-122.

"Database Scanner™, User Guide," Version 3.0.1,, © 1999 by Internet Security Systems, Inc., pp. 1-164.

"Real Secure™, Network Sensor User Guide," Version 5.0, © 2000 by Internet Security Systems, Inc., pp. 1-42.

"Real Secure, Server Sensor User Guide," Version 5.5, © Internet Security Systems, Inc. 2000, pp. 1-56.

"Internet Scanner™, User Guide," Version 6.0, Copyright © 1999 by Internet Security Systems, Inc., pp. 1-182.

"Internet Scanner™, User Guide," Version 6.1, © 2000 by Internet Security Systems, Inc., pp. 1-226.

"Internet Scanner™, User Guide," Version 5.6, © 1992-1998, Internet Security Systems, Inc., pp. 1-162.

"Internet Scanner™, User Guide," Version 5.3, © 1992-1998, Internet Security Systems, Inc. pp. 1-173.

"Real Secure, Console User Guide," Version 5.5, © 199?-2000, Internet Security Systems, Inc., pp. 1-162.

"Internet Scanner™, User Guide," Version 5.8, © 1999 by Internet Security Systems, Inc., pp. 1-148.

"SAFEsuite Decisions, User Guide," Version 1.0, © 1992-1998, Internet Security Systems, Inc., pp. 1-88.

"Real Secure™, Console User Guide," Version 5.0, © 2000 by Internet Security Systems, Inc., pp. 1-114.

"SAFEsuite DECISIONS, User Guide," Version 2.5, © 2000 by Internet Security Systems, Inc., pp. 1-194.

"System Scanner, User Guide," Version 1.7, © 1992-1998, Internet Security Systems, Inc., pp. 1-248.

"Sytem Scanner, User Guide," Version 1.0, © 1996-1998, Internet Security Systems, Inc., pp. 1-316.

"System Scanner™, User Guide," Version 4.0, © 1999 by Internet Security Systems, Inc., pp. 1-178.

Internet Security Systems, Inc., "Introduction to RealSecure Version 5.0, The Industry's Only Integrated Host-Based and Network-Based Intrusion Detection System", Aug. 22, 2000, pp. 1-47.

Internet Security Systems, Inc., "RealSecure Network Sensor and Gigabit Network Sensor Policy Guide Version 7.0", Aug. 2003, pp. 1-86.

Internet Security Systems, Inc., "RealSecure Console User Guide Version 3.1", Jun. 1999, pp. 1-98.

Internet Security Systems, Inc., "RealSecure Version 2.0", Apr. 1998, pp. 1-154.

Internet Security Systems, Inc., "Enhanced Dynamic Threat Protection via Automated Correlation and Analysis", an ISS White Paper, 2002, pp. 1-14.

Internet Security Systems, Inc., "RealSecure Site Protector Comparison Guide for Internet Scanner 7.0 Reporting Version 1.2", Mar. 2003, as ISS Tech Note, pp. 1-15.

Internet Security System, Inc., "RealSecure Site Protector Comparison Guide for ICEcap Manager Version 1.5", Jan. 2002, as ISS Technical White Paper, pp. 1-27.

Internet Security Systems, Inc., "RealSecure SiteProtector Security Fusion Module 2.0 Frequently Asked Questions", Mar. 2003, pp. 1-8.

Internet Security Systems, Inc., "RealSecure SiteProtector Console User Reference Guide Version 2.0 Service Pack 1", Mar. 14, 2003, Chapter 3, pp. 1-27.

Internet Security Systems, Inc., "Proventia Gateway and Network Protection", Jul. 2003, pp. 1-12.

Farley, Internet Security System, Inc., "ID Fusion Technology, A First-Generation Approach", Apr. 29, 1999, National Security Framework Forum, pp. 1-8.

Farley, "RealSecure Fusion Engine Concepts", an ISS White Paper, Jun. 30, 1999, pp. 1-23.

Frans Veldman, "Heuristic Anti-Virus Technology," Proceedings, 3$^{rd}$ International Virus Bulletin Conference, pp. 67-76, Sep. 1993.

Symantec, Understanding Heuristics: Symatec's Bloodhound Technology, Symantec White Paper Series, vol. XXXIV, pp. 1-14, Sep. 1997.

Carey Stover Nachenberg, "A New Technique for Detecting Polymorphic Computer Viruses," A thesis submitted in partial satisfaction of the requirements for the degree Master of Science in Computer Science, University of California Los Angeles, pp. 1-127, 1995.

Andrew P. Kosoresow, et al., "Intrusion Detection Via System Call Traces," IEEE Software, pp. 35-42, Sep./Oct. 1997.

"INFO: Visual Basic Supports P-Code and Native Code Compilation (Q229415)," found at http://support.microsoft.com/support/kb/articles/Q229/4/15.ASP, Apr. 28, 1999, pp. 1-2.

"Microsoft P-Code Technology," http://msdn.microsoft.com/archive/default.asp?url=/archive/en-us/dnarvc/html/msdn_c7pcode2.asp, pp. 1-6, Apr. 1992.

"DJGPP COFF Spec," http://delorie.com/digpp/doc/coff/, pp. 1-15, Oct. 1996.

Natvig, Kurt, "Sandbox Technology Inside AV Scanners," Virus Bulletin Conference, Sep. 2001, pp. 475-488.

"Norman introduces a new technique for eliminating new computer viruses," found on Norman's website, file://C:\Documents%20and%20Settings\7489\Local%20Settings\Temporary%20Internet%20Files\OLK, pp. 1-2, published Oct. 25, 2001, printed from website Dec. 27, 2002.

Lee et al., "A Generic Virus Detection Agent on the Internet," System Sciences, 1997, Proceedings of the Thirtieth Hawaii International Conference on Wailea, HI, Jan. 7-10, 1997, pp. 210-219, #XP010271868.

International Search Report for PCT/US01/19142, international filing date Jun. 14, 2001, mailing date Jan. 17, 2003.

Gong, Li, "Java™ Security Architecture (JDK1.2)," Oct. 2, 1998, Sun Microsystems, Inc., Version 1.0, pp. i-iv, 1-62.

"Softworks Limited VBVM Whitepaper," [online] Nov. 3, 1998 [accessed Mar. 19, 2003], Retrieved from Internet <URL: http://web.archive.org/web/19981203105455/http://softworksltd.com/vbvm.html>, pp. 1-4.

Kephart, "A Biologically Inspired Immune System for Computers," Artificial Life, IV, 1994, pp. 130-139.

* cited by examiner

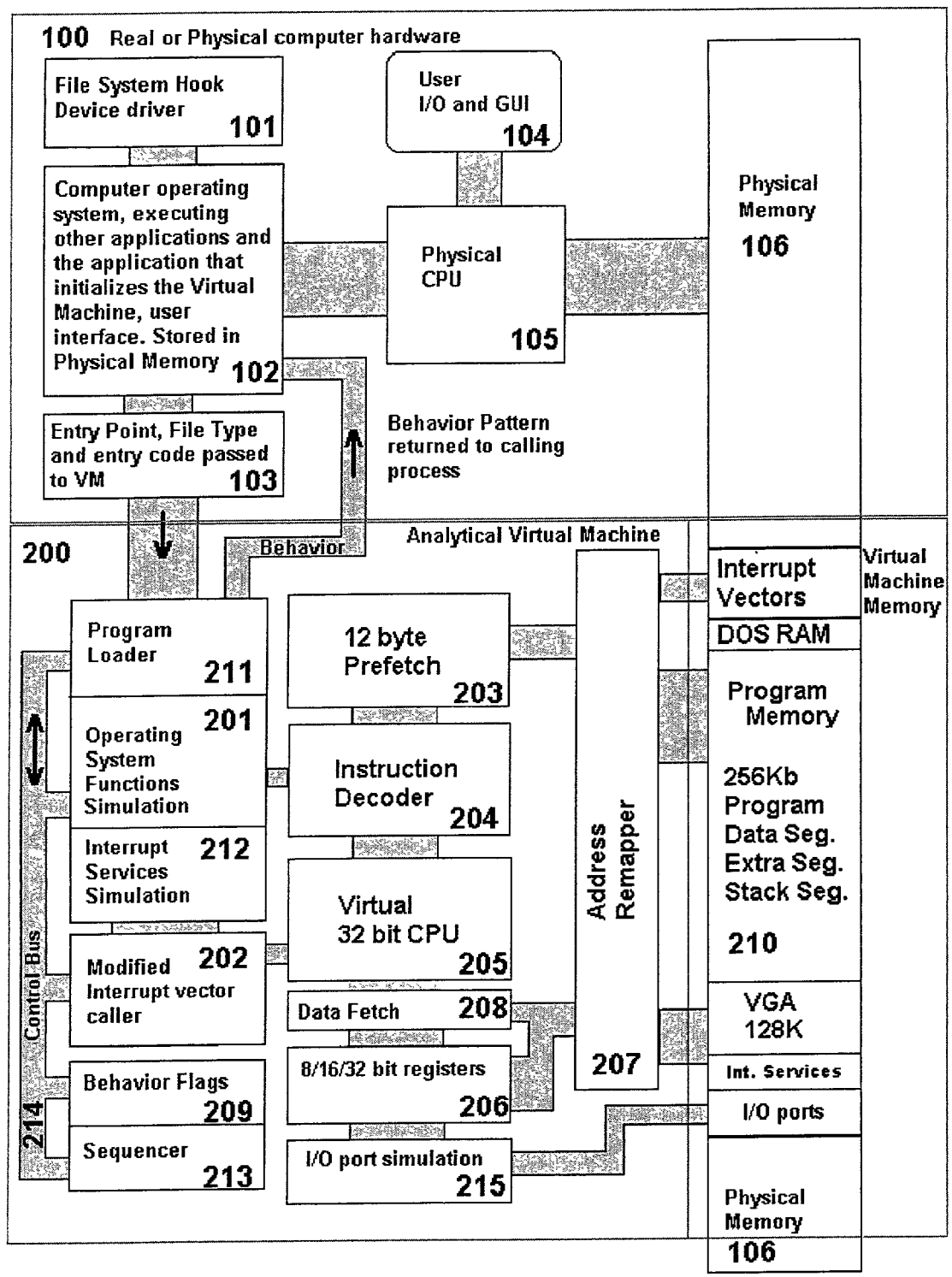
Figure 1: The vCIS Analytical Virtual Machine

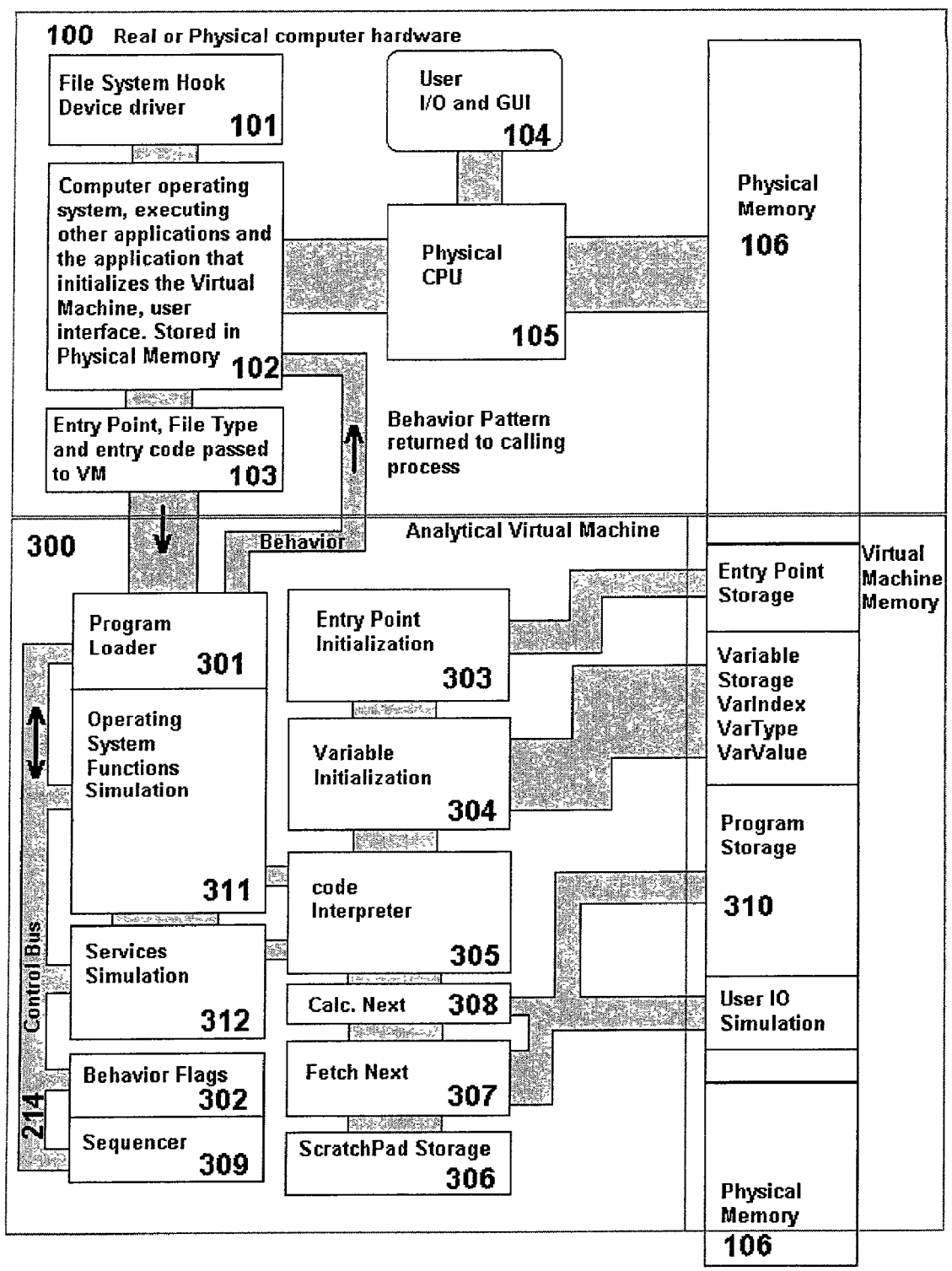
Figure 2: The vCIS VM for execution of HLL program code

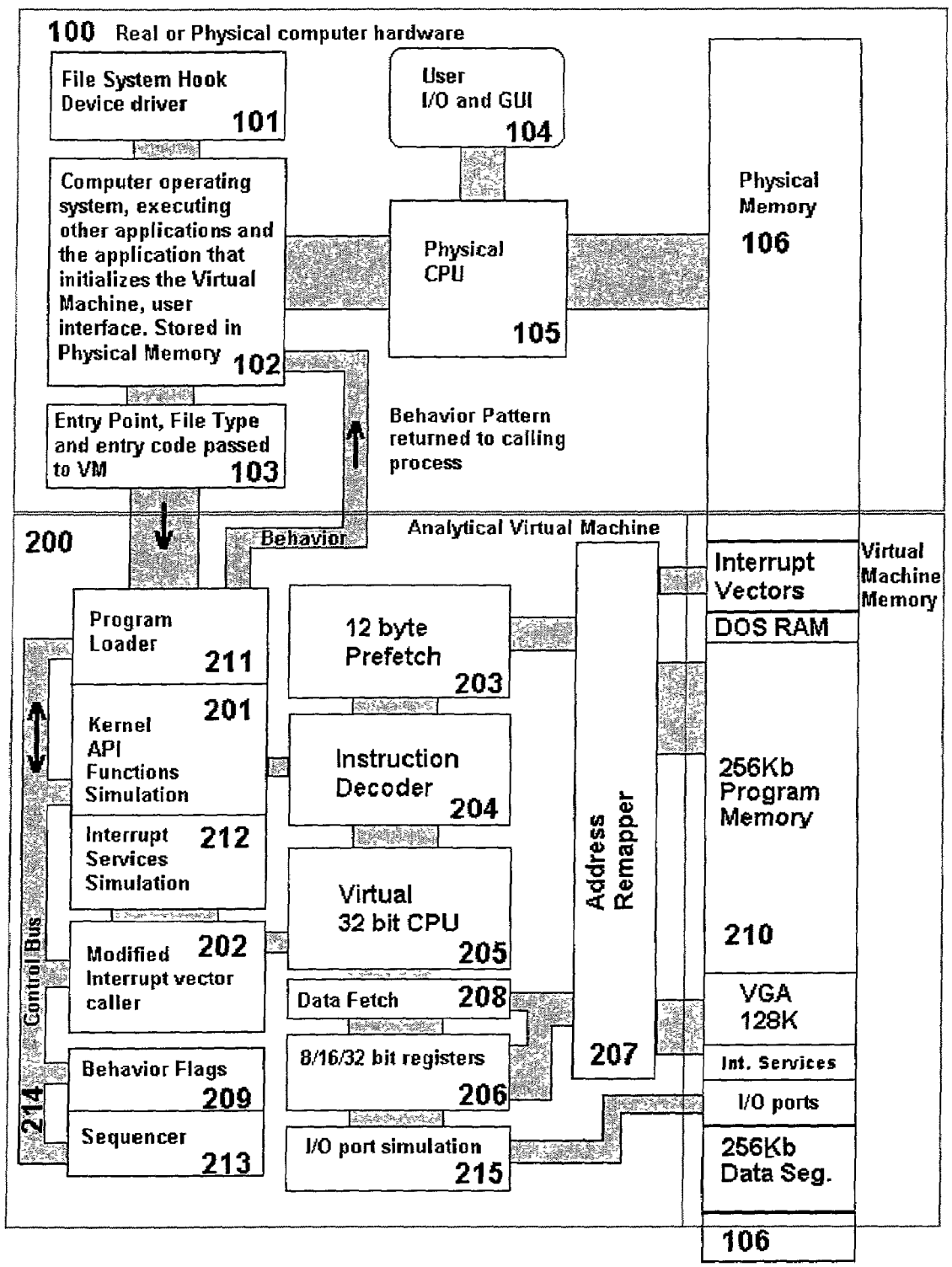
Figure 3: The vCIS Analytical Virtual Machine running 32bit code

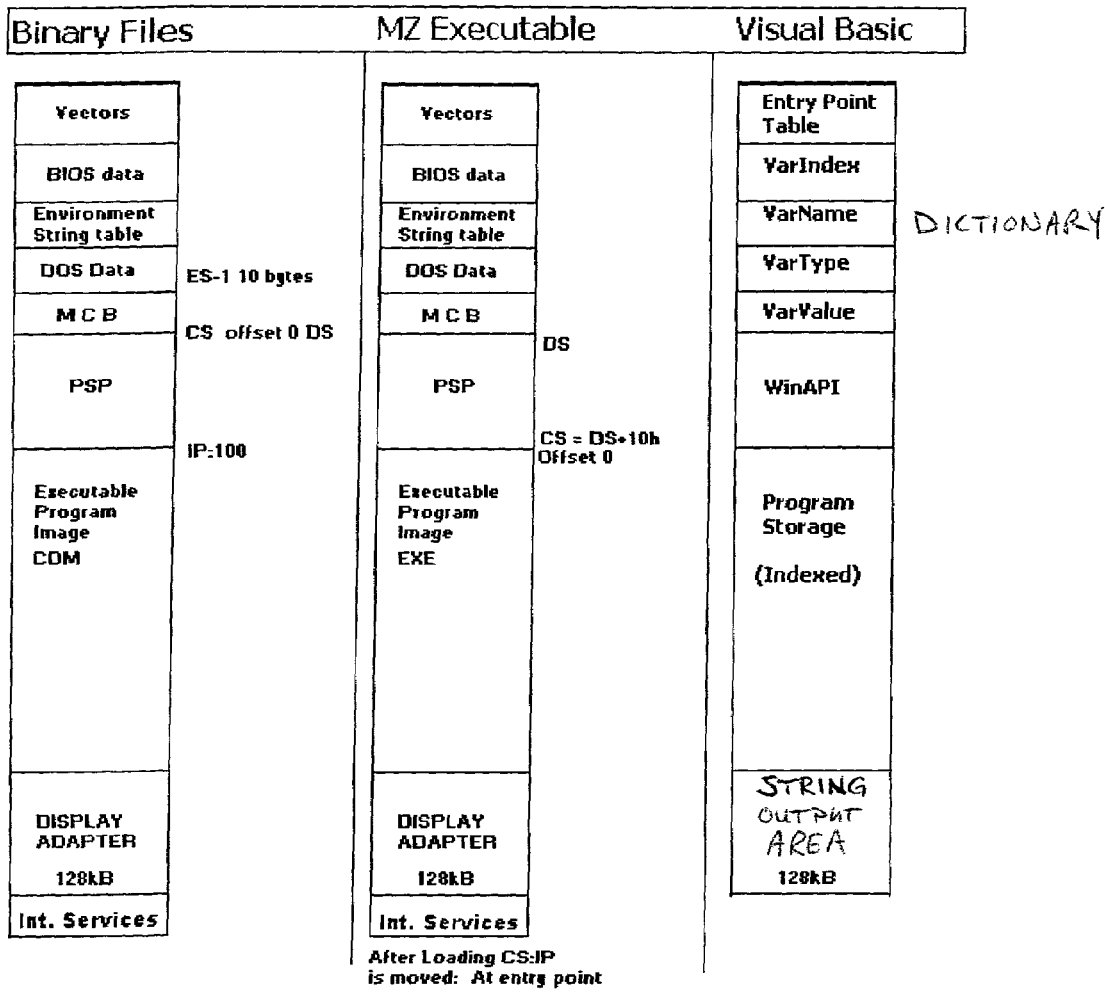
Figure 4: Analytical Virtual Machine memory maps for 3 different operating modes.

| Bit | Label | Description |
|---|---|---|
| 0 | OldEntry | Program code contains the previous recorded entry point code and offset |
| 1 | Version | Version information in the file is unchanged |
| 2 | Encryption | Code contains a decryption (self modifying) procedure |
| 3 | SelfMod | Code modifies its own functionality |
| 4 | InterruptMod | Code modifies the Interrupt Vector Table contents |
| 5 | Jump | Relative Jump near entry point of the code |
| 6 | Tunnel | Contains Interrupt tunneling through Int1 or Int3 Trap flag |
| 7 | Attach | Contains a procedure that copies this code to the end of other executables |
| 8 | ExeSize | Gets the size of an executable |
| 9 | ExeAccess | Opens an executable file |
| 10 | ExeWrite | Contains code that writes to an executable |
| 11 | ExeRead | Contains code that reads code from an executable |
| 12 | ExeSearch | Contains a search procedure that looks for executables in this directory |
| 13 | ExeSearchRpt | The search procedure is repeated |
| 14 | ExeKill | The code kills executables or source files |
| 15 | DirKill | The code kills entire directories |
| 16 | Reloc | Code relocates itself in memory |
| 17 | MemAlloc | Code allocates memory blocks to itself |
| 18 | MemStealth | Code labels memory control blocks (MCB's) as owned by operating system |
| 19 | FlexEntry | Code is relocatable |
| 20 | DirectAccess | Code attempts to directly access the hard disk drive (HDD) |
| 21 | TSR | Code terminates but stays resident |
| 22 | Chained | Code loads another executable and passes control to it. |
| 23 | Ring0 | Code contains a call gate to ring0 |
| 24 | DataOverlap | Code and Data segments overlap, creating a writable code segment |
| 25 | ReEntry | Recursive re-entrant code |
| 26 | Overwrite | Overwrites files on HDD |
| 27 | ExeHdr | File format is inconsistent |
| 28 | EmuFail | Code failed to run in virtual environment |
| 29 | StandardSys | takes over a standard operating system, or attaches to standard OS function |
| 30 | IntRoutineAdd | Code contains a Interrupt Service Routine to which a new IVT entry is mapped |
| 31 | HWBios | Flashes the BIOS ROM with non-BIOS code (format of code) |
| 32 | EntryOut | Entry to code is not within code segment but in Data segment |

FIG. 5A

| Bit | Label | Description |
| --- | --- | --- |
| 33 | MoveEnd | Entry point is near the end of the code segment |
| 34 | VSafeOff | A call is mode to the OS to switch off vSafe (a DOS based behavior blocker) |
| 35 | WriteDirect | The code attempts to write direct to the HDD hardware |
| 36 | MBRinfect | The code attempts to write direct to sector 1, track 0, Head 0 of the HDD |
| 37 | SectorSmash | Smashes sectors on the HDD by writing garbage |
| 38 | Stealth | Code contains instructions to hide its code from other programs (OS hooking) |
| 39 | TimeTrigger | Code contains a function that checks system time and branches accordingly |
| 40 | Formats | Calls Format function or API |
| 41 | SneakyInt | Calls an interrupt as a far call rather than using INT nn call |
| 42 | ReadChksum | Reads checksum value from executable file header |
| 43 | WriteChksum | Writes new checksum value to executable file header |
| 44 | EntryMod | Changes the Entry point value in the header |
| 45 | EntryCodeMod | Writes to the entry point location of an executable file |
| 46 | HwintCtl | Writes direct to the Interrupt Controller |
| 47 | API | Modifies a system API |
| 48 | SectorSize | Sets sector size of NE/PE/LE files to maximum and copies own code there |

FIG. 5B

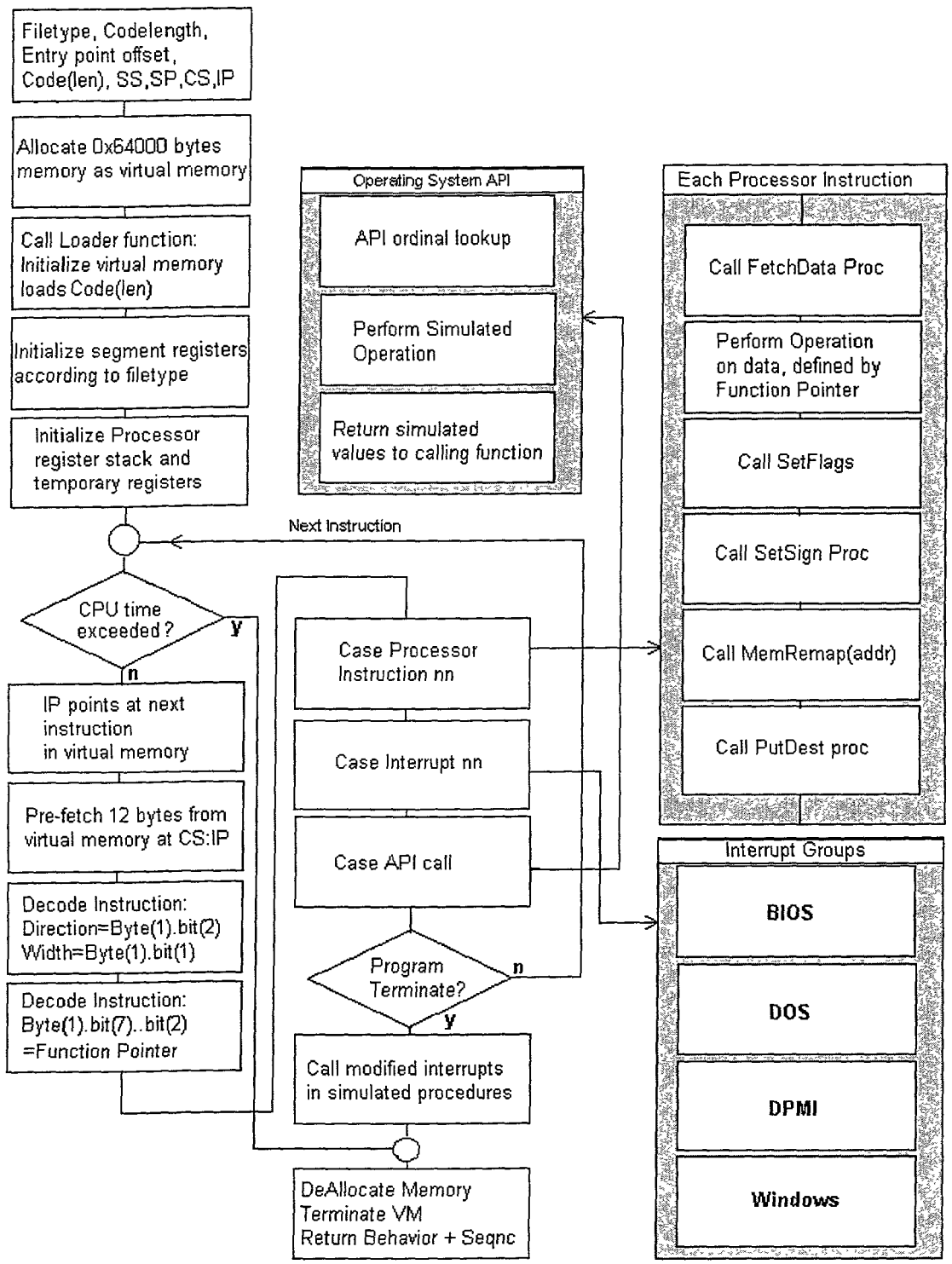
Figure 6: Processing flow within the AVM

ANALYTICAL VIRTUAL MACHINE

PRIORITY CLAIM AND RELATED APPLICATION

This application claims priority from U.S. provisional patent application Ser. No. 60/242,939 filed Oct. 24, 2000, which application is incorporated by reference in its entirety. This application is related to U.S. patent application Ser. No. 09/642,625, filed Aug. 18, 2000, which application is incorporated by reference in its entirety.

BACKGROUND OF THE INVENTION

1. Field of the Invention

The present invention relates to a virtual machine system and, more particularly, relates to a virtual machine system appropriate for automated code analysis and capable of analyzing data including executable programs presented to a computer system.

2. Discussion of the Related Art

Detection of malicious code including programs such as viruses has been a concern throughout the era of the personal computer. With the growth of communication networks such as the Internet and increasing interchange of data, including the rapid growth in the use of e-mail for communications, the infection of computers through communications or file exchange is an increasingly significant consideration. Infections take various forms, but are typically related to computer viruses, trojan programs, or other forms of malicious code. Recent incidents of e-mail mediated virus attacks have been dramatic both for the speed of propagation and for the extent of damage, with Internet service providers (ISPs) and companies suffering service problems and a loss of e-mail capability. In many instances, attempts to adequately prevent file exchange or e-mail mediated infections significantly inconvenience computer users. Improved strategies for detecting and dealing with virus attacks are desired.

One conventional technique for detecting viruses is signature scanning. Signature scanning systems use sample code patterns extracted from known malicious code and scan for the occurrence of these patterns in other program code. In some cases program code that is scanned is first decrypted through emulation, and the resulting code is scanned for signatures or function signatures. A primary limitation of this signature scanning method is that only known malicious code is detected, that is, only code that matches the stored sample signatures of known malicious code is identified as being infected. All viruses or malicious code not previously identified and all viruses or malicious code created after the last update to the signature database will not be detected. Thus, newly created viruses are not detected by this method; neither are viruses with code in which the signature, previously extracted and contained in the signature database, has been overwritten.

In addition, the signature analysis technique fails to identify the presence of a virus if the signature is not aligned in the code in the expected fashion. Alternately, the authors of a virus may obscure the identity of the virus by opcode substitution or by inserting dummy or random code into virus functions. Nonsense code can be inserted that alters the signature of the virus to a sufficient extent as to be undetectable by a signature scanning program, without diminishing the ability of the virus to propagate and deliver its payload.

Another virus detection strategy is integrity checking. Integrity checking systems extract a code sample from known, benign application program code. The code sample is stored, together with information from the program file such as the executable program header and the file length, as well as the creation date and creation time for the program file. The program file is checked at regular intervals against this database to ensure that the program file has not been modified. A main disadvantage of an integrity check based virus detection system is that a great many warnings of virus activity issue when any modification of an application program is performed. For example, integrity checking programs generate long lists of modified files when a user upgrades the operating system of the computer or installs or upgrades application software. It is difficult for a user to determine when a warning represents a legitimate attack on the computer system.

Checksum monitoring systems detect viruses by generating a cyclic redundancy check (CRC) value for each program file. Modification of the program file is detected by a variation in the CRC value. Checksum monitors improve on integrity check systems in that it is more difficult for malicious code to defeat the monitoring. On the other hand, checksum monitors exhibit the same limitations as integrity checking systems in that many false warnings issue and it is difficult to identify which warnings represent actual viruses or infection.

Behavior interception systems detect virus activity by interacting with the operating system of the target computer and monitoring for potentially malicious behavior. When such malicious behavior is detected, the action is blocked and the user is informed that a potentially dangerous action is about to take place. The potentially malicious code can be allowed to perform this action by the user. This makes the behavior interception system somewhat unreliable, because the effectiveness of the system depends on user input. In addition, resident behavior interception systems are sometimes detected and disabled by malicious code.

Another conventional strategy for detecting infections is the use of bait files. This strategy is typically used in combination with other virus detection strategies to detect an existing and active infection. This means that the malicious code is presently running on the target computer and is modifying files. The virus is detected when the bait file is modified. Many viruses are aware of bait files and do not modify files that are either too small, obviously bait files because of their structure or have a predetermined content in the file name.

It is apparent that improved techniques for detecting viruses and other malicious types of code are desirable.

Aspects of the present invention utilize certain characteristics of virtual machine technology. The concept of a "virtual machine" is known in the art and virtual machines have found various uses. The merits of the "virtual machine" include the ability to execute code that would not execute on the hardware platform under other circumstances, such as code intended for other hardware platforms. Other applications of virtual machine technology can be found in multi-user and multi-processing systems, where each process runs within its own virtual machine.

Virtual machines have been applied to various computer functions, such as in the interface between computer hardware and high level languages (HLL) (U.S. Pat. No. 5,872, 978 to Hoskins), the networking of real machines to form a parallel processor (U.S. Pat. No. 5,774,727 to Walsh et al.) and to create a multi-tasking or multi-user computer environment (U.S. Pat. No. 4,400,769, to Kaneda et al.). Virtual machines have also been applied where cross-platform HLL code portability is required (U.S. Pat. No. 6,118,940 to Alexander, III et al).

SUMMARY OF THE PREFERRED EMBODIMENTS

An aspect of the invention provides a virtual machine system for computer code behavior analysis, the virtual machine system having a software processor. The processor stores a behavior record including behavior flags representative of computer code behavior observed by virtually executing the computer code under analysis within the virtual machine. A sequencer stores a sequence in which behavior flags are set in the behavior record during virtual execution of the computer code under analysis. Simulated memory and a simulated operating system representative of a host real computer system are provided and the computer code under analysis interacts with the simulated memory and the simulated operating system to generate the behavior flags. The virtual machine passes data representative of the behavior record to the host real computer system prior to termination of the virtual machine.

Another aspect of the present invention provides a virtual machine system for computer code behavior analysis having a software processor. The virtual machine includes a register or structure that stores behavior flags representative of computer code behavior observed by virtually executing the computer code under analysis within the virtual machine. The virtual machine also includes a register or structure that stores a sequence in which behavior flags are set in the behavior flags register or structure. Registers or structures store all entry points to the computer code under analysis within the virtual machine. A structure stores interrupt vector addresses that point at interrupt service routines loaded into memory reserved by the virtual machine when the virtual machine is initialized. A memory structure simulates input and output ports and another memory structure simulates processor memory. One or more operating system simulation shells simulate values returned by a real operating system under which the computer code under analysis is intended to operate.

BRIEF DESCRIPTION OF DRAWINGS

FIG. 1 illustrates a configuration of an analytical virtual machine with DOS MZ-type executable or binary file.

FIG. 2 illustrates a configuration of an analytical virtual machine with high level language (HLL) program code.

FIG. 3 illustrates a configuration of an analytical virtual machine running PE, NE or LE WINDOWS executable code (code that produces rectangular graphics containing a graphical user interface).

FIG. 4 shows a memory map onf an analytical virtual machine running a binary (COM or SYS) executable and running a VISUAL BASIC (VB) executable (a software program designed to facilitate the development of systems with a graphical user interface).

FIGS. 5A and 5B schematically illustrate a table listing behavior pattern, sequencer and entry point structures generated by a preferred implementation of the analytical virtual machine.

FIG. 6 shows a schematic procedure flow diagram of a preferred implementation of the analytical virtual machine executing binary machine code.

DETAILED DESCRIPTION OF THE PREFERRED EMBODIMENTS

Figure 7:
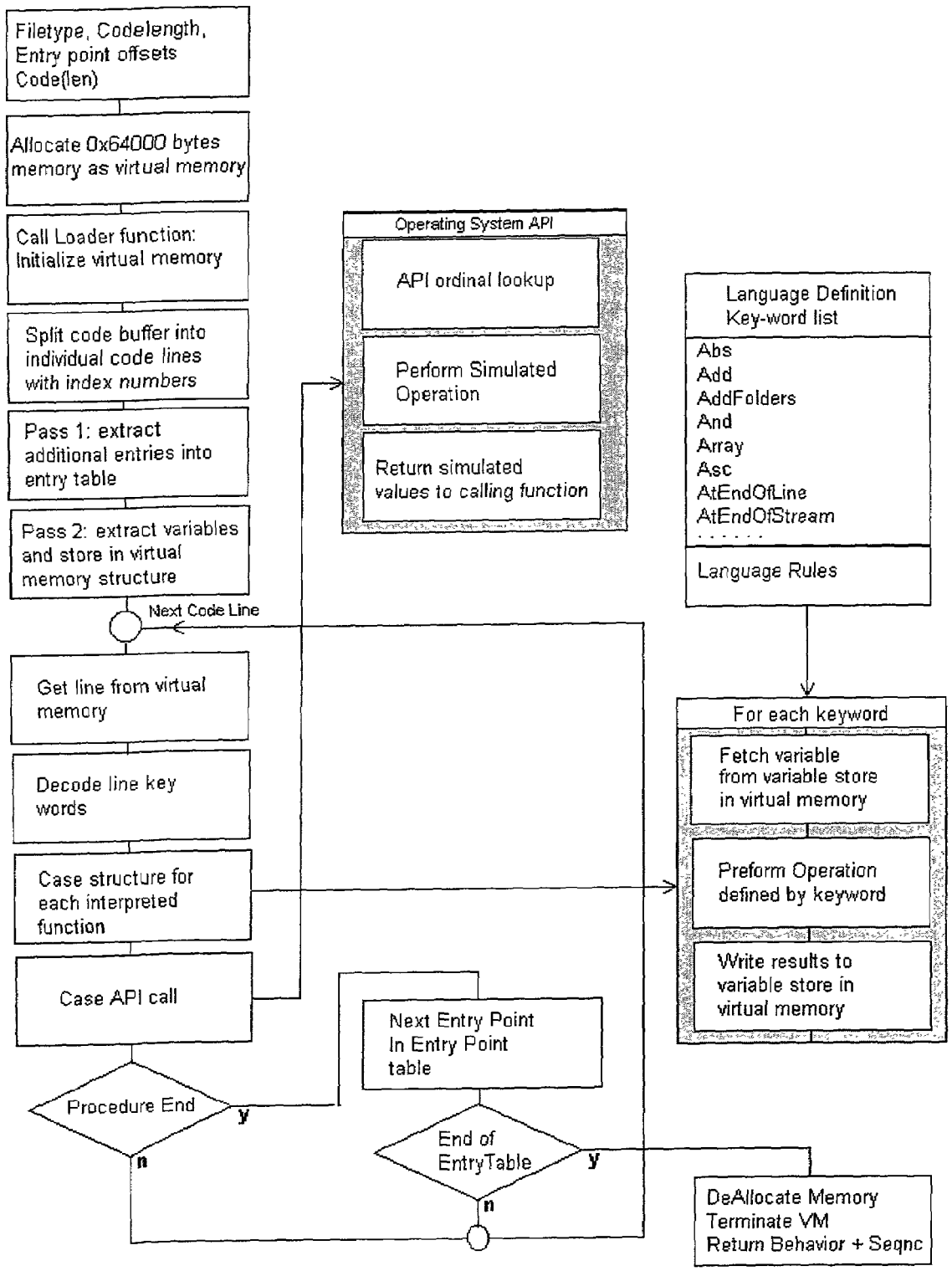
FIG. 7 shows a schematic procedure flow diagram of a preferred implementation of the analytical virtual machine executing HLL.

Preferred implementations of the present invention provide an analytical virtual machine (AVM) system that executes program code within an emulated computer system in a manner similar to how the code would be executed in a real computer system. Preferred implementations of an analytical virtual machine do not allow physical input or output to take place or any interaction between the program code under analysis and the real or physical computer system. Instead, input and output operations, system calls, and instructions are simulated in a manner transparent to the code under analysis. System functions, operating system application program interface (API) calls, input and output commands and alterations to pre-defined memory locations preferably are all logged by the analytical virtual machine during execution of the code being analyzed. Most preferably the analytical virtual machine returns the logged data to the real or physical computer system as both a behavior pattern and a sequence structure representing the sequence in which the behavior pattern bits were set during virtual execution.

The analytical virtual machine (AVM) described here is intended to be used in automated code function analysis and behavior extraction. The "code" is either binary machine code or high level language (HLL) in either tokenized or source code text format. The analytical virtual machine executes the code to be analyzed from each entry point in the entry point table that is passed to it. While virtually executing code, the AVM monitors system calls, input/output (I/O) operations and memory accesses. Either machine language instructions or high-level language instructions are executed within the emulated central processing unit (CPU) of the AVM. Operating system functions called by the application code, input/output port read and write operations and memory read and write operations performed by the application code are simulated within the AVM environment.

Previous analytical systems scanned code without virtual execution. In such systems, application code was scanned for function calls or target code snippets (U.S. Pat. No. 5,440,723 to Arnold et al.). The scanning method has several disadvantages, the first being that a code pattern match may be out of synchronization with the actual executed code. Another disadvantage of the scanning method is that direct access to a function, that is a function access that is not through a documented call structure, is not detected. In addition, a control fields in memory, which are filled by code execution, are not present and so are not analyzed in the scanning method. A third disadvantage is that persons who write malicious code are likely to disguise the real function of that code by inserting 'do nothing' code into the function template or by calling the function in an unconventional manner. Because of these disadvantages a scanning analysis system is less than exact.

Preferred implementations of the present invention employ an analytical virtual machine like that presented here. Such a virtual machine executes application program code in step with the real program flow beginning from each entry point. When using such a particularly preferred analytical virtual machine, an exact representation of the functions contained within the application program code is obtained. 'Do Nothing' instructions no longer are effective in disguising code. Calling a function in an unconventional manner will have no effect if the AVM is implemented in the particularly preferred manner to respond as the real machine would.

As will be explained below in greater detail, the use of a virtual machine in code analysis has an advantage that, as compared to a conventional native machine, code is analyzed by executing the code within a safe environment. Here "safe" refers to the fact that the operating system, programs and data of the real computer system do not interact with code under analysis and so are not likely to be damaged by the code under analysis. Analysis nevertheless takes place in step with normal code execution, as if the code were executed on a native machine using a real processor system.

Thus, preferred implementations of the analytical virtual machine can accommodate a plurality of operating systems and hardware platforms for simulation. The organization of the computing system can be flexibly modified. Further, it is possible to supervise the operation of the system. In certain presently preferred embodiments, a supervision function is built into the virtual operating system of the AVM to analyze the behavior of the unknown program code. FIG. 1 shows a block diagram of a current implementation of the AVM within a physical computer system. Like a compiler-based virtual machine, the AVM processes the flow of the code stream. Unlike a compiler-based virtual machine, code is executed and virtual operating system functions are called.

FIG. 1 shows the organization of a computer system running an instance of the AVM that has been initialized for execution of a DOS MZ-type executable or DOS binary COM or SYS program, including the boot sector loader used by such programs. The area inside the box labeled 100 represents a real machine, that is, the hardware of a computer comprising the physical central processing unit (CPU), physical memory, and user input and output channels. The input and output channels include the keyboard, mouse, video display, disk drives and other peripheral equipment connected to the processing unit. The operating system 102 is stored in physical memory 106 together with device drivers and applications programs that are in the process of execution, likely within other virtual machines. All such software is executed by the real central processing unit (CPU) 105. One device driver is shown in the block diagram, which is the file system hook device driver 101. File system hook device driver 101 hooks to the real operating system file system and informs the application which launches the AVM of modifications to files stored on the hard disk drive.

The operating system software 102 resides in memory 106 and operates within the real machine 100. The application program 103 that initializes and receives the results of the analytical virtual machine 200 exists on the real machine, executing within the operating system 102 environment, as does the analytical virtual machine 200. After the analytical virtual machine 200 is initialized, the application program passes the entry point, the file type and a buffer containing the segment holding the program's main entry point through 103 to the program loader pre-processor 211.

Once the virtual machine is created, a part of physical memory 106 is reserved by the application program for use by the virtual machine. This memory block is labeled 210 and exists in physical memory 106. The preprocessor 211 prepares virtual memory block 210 for use by the analytical virtual machine and creates all appropriate, simulated operating system memory blocks, such as the interrupt vector table (IVT) at virtual addresses 0000 to 1023, the DOS parameter area at virtual addresses 1024 to 1279, the program area and the memory reserved for the VGA display (mapped at virtual address 0A000h). The program loader pre-processor 211 creates memory control blocks (MCB's) and then loads the entry point code into this memory. In simulated high memory, above the 640K boundary of the IBM PC base memory map, virtual interrupt service routines are created. All addresses referenced by the program code under analysis are remapped to fit inside this memory model by software memory mapper 207.

After the program loader 211 completes the initialization of the virtual DOS memory model, the virtual CPU 205 commences fetching program instructions through the prefetch mechanism 203. Depending on the second byte (the Or/m byte) of each instruction fetched and decoded by software instruction decoder 204, the software or virtual CPU fetches from the register stack 206 or from the virtual memory 210, using the data fetch mechanism 208 and memory mapper 207.

The software CPU 205 performs the desired operation on the data and writes the results back to the destination determined by the Or/m byte. Referenced operating system functions are simulated in the operating system simulator 201. Interrupt services are simulated in the interrupt services simulator 212, with vectors stored in virtual memory 210 at addresses 0000 to 1023. The interrupt services in high memory act as a link between the interrupt vector table and the simulated interrupt services 212. The memory block 210 also contains the system stack and the application code stack. The system and application code stacks are not shown, since they are created at the addresses contained within the application code under analysis and vary from application to application. Data are fetched from the virtual stack area reserved in memory 210 if the control byte Or/m indicates that this is required.

The software CPU 205 has a prefetch mechanism 203, and an instruction decoder 204. As instructions are fetched, decoded and executed, the program code under analysis performs simulated functions. The execution of each simulated function sets and resets flags in the behavior flags register 209 and the sequence in which these operations take place is recorded in sequencer 213. The resulting behavior flag pattern, together with the sequencer structure, are passed to the application that initiated the analytical virtual machine. The analytical virtual machine is then terminated in presently preferred embodiments.

This process is further illustrated in FIG. 6, which shows a block diagram of a procedure flow within a preferred implementation of the AVM. FIG. 6 is, like the other figures, illustrative of a preferred implementation but is not intended to limit the scope of the present invention. The program loader pre-processor function is show in the top left hand corner. The application program passes the file type, code length, entry point offset and a buffer of length "len" containing the entire entry segment code as well as the SS (stack segment), SP (stack pointer), CS (code segment) and the IP (instruction pointer) register values contained within the executable file. The loader pre-processor then reserves a block of physical memory for use by the AVM as virtual memory. The size of the memory block reserved for virtual memory is at this moment limited to 64000 h bytes (409600 decimal). However, the size of the virtual memory is not relevant to the operation of the AVM and so should not be considered limiting.

The virtual memory map is initialized to contain the interrupt vector table, the BIOS parameter area, the DOS parameter area, the environment string table, the program segment prefix (PSP) and the display adapter memory block (mapped at 0A000h). An area is reserved above the display adapter memory block in which interrupt service routines (ISR's) are created for each of the 1024 interrupts contained within the interrupt vector table (IVT). Then the remaining memory is configured as memory blocks controlled by memory control blocks (MCB's). The entry segment code, passed to the AVM by the controlling application program, is placed within the MCB memory blocks in virtual memory. Next, the virtual processor's segment registers; SS, ES, DS, CS, GS and FS, are initialized with values that depend on the type of executable code that is placed in virtual memory. Then the register stack EAX, EBX, ECX, EDX, ESP, EBP, ESI, EDI and the flags register are initialized. The monitor function, which sets and resets flags in the behavior register, is built into individual operating system calls, interrupt calls and API calls, as well as the address remapper and the interrupt service routines. During each of the following instruction processing loops, the AVM checks if the maximum allowed CPU time has been exceeded. This virtual CPU time limit is most preferably imposed to break deadlock conditions, where the code under analysis causes the AVM to enter an endless loop. Proper configuration of the CPU time limit allows long decryption or polymorphic loops to be processed with risking deadlock.

The IP register points to the entry point in the virtual memory. At this point in the virtual execution process, the virtual CPU starts to fill the 12-byte prefetch queue. The bytes are decoded according to Intel's PENTIUM (high-performance microprocessor) instruction set reference, whereby the first byte in this 12-byte queue determines the function of the instruction word. The instruction word comprises an operation, an interrupt call or an operating system API call. Of course, in implementations for other processors, other instruction set references will be appropriate and the specific details will vary. It will be apparent from this discussion how to implement the analytical virtual machine for different processors and different operating system implementations.

In case of an operation, the FetchData procedure is called, which retrieves the correct data either from virtual memory, the prefetch queue or from the processor's registers, depending on the values stored in the $2^{nd}$ byte of the prefetch queue (the Or/m byte). The data thus retrieved is processed, e.g. added, divided, multiplied or processed through a multitude of other arithmetic or logic operators applied to the data. Then the SetFlags procedure is called, which evaluates the result of the operation that was performed and sets flags in the virtual flags register accordingly. The SetSign procedure adjusts the sign of the processed results. The MemRemap procedure takes as its input the address of the destination in virtual memory. This address is remapped to fit into the 409600 bytes reserved for virtual memory. Monitoring of address space modifications is performed in the MemRemap procedure.

In case of an interrupt call, the call index is passed to a procedure that passes control to the appropriate interrupt service routine by looking up the address in the interrupt vector table (IVT). Analysis then continues by executing the appropriate interrupt service routine, either in virtual BIOS, virtual DOS, virtual DPMI, virtual Windows (native API) or in the code under analysis if that code has modified the IVT to point at one of its own procedures. Monitoring of interrupt functions is performed in the appropriate procedures.

In case of an API call, the call is passed to a procedure that attaches the relevant ordinal number to the call, and passes control to the virtual API. This virtual API contains procedures that simulate the response, but not the functionality, of the real operating system API. Monitoring of API functions is performed in each API procedure. API functions modify areas of virtual memory, so that subsequent virtual API calls can read back the correct and expected results.

This sequence of events continues to take place until a terminate program system call is encountered or a far jump is performed that is outside the current segment. Whenever a branch instruction is encountered, the AVM will use the parameters intended by the original programmer to jump, but store the other side of the branch in the entry point table together with the conditions used in the branch instruction. The entry point table is traversed and code is executed from each entry point in the entry point table. No duplication is allowed in the entry point table. When all entry points have been processed, the resulting behavior pattern is returned to the calling application, together with the sequencer structure and the AVM is terminated, releasing the reserved memory block. The calling program within the real computer system can then review the behavior pattern and the sequencer to evaluate the code analyzed by the AVM.

FIG. 2 shows a configuration of the AVM with a code interpreter shell loaded, of the type appropriate to running a high level language. The program loader 301 splits the program code into individual lines, indexes the program lines and places them in virtual memory 310. During this load operation, entry point information is extracted from the code and placed in an entry point table, together with the program line index that each entry point references. Variables used in the program code are extracted in the AVM's second pass through the program code. Variables are stored in a variable structure in virtual memory 310, containing the variable index, the variable type, and the current value of the variable, initialized to zero prior to emulation. At this point the code interpreter 305 receives control and starts to fetch instructions from the first entry point in the entry point table. Instructions are interpreted, operating on the variables in the variable structure at the position from which instructions are fetched (jump instructions) or they call system services (open file, write file etc.) and perform application program interface (API) calls. System services are simulated in the services simulation procedure 312. The Calc. Next procedure 308 calculates the next line number in memory 310 from which the next instruction line is to be fetched by the Fetch Next procedure 307. The behavior flags register 302 monitors the initialization of certain system variables, system service and API calls. These events set and reset bits in the behavior flags register 302. The sequence in which behavior register flags are set or reset is also recorded in the sequencer structure 309. Scratchpad storage 306 is used to temporarily store the condition of system services, which may be referenced at a later time by the application program code.

The system performs the sequence of events for each instruction line, and continues at each entry point in the code until all entry points in the entry point table have been processed. The AVM then returns the behavior pattern, together with the sequencer structure, to the calling program and the AVM is terminated. The process flow of the FIG. 2 instance of the AVM is further illustrated in FIG. 7, which shows the processing flow within the current AVM implementation after the AVM has been initialized to interpret and extract the behavior pattern of a high level language (HLL) program, such as VB SCRIPT code (scripting language based on Visual Basic, a software program designed to facilitate the development of systems with graphical user interface). The language definition key-word list and rules define the language interpreted by the processing core. In FIG. 7, a keyword list is shown that is a cross between VBA and VBS, but the processing core is not limited to those languages.

When the AVM of FIG. 7 is initialized, a 409600 byte (hexadecimal 0×64000) block of real memory is reserved as virtual computer memory. The loader function initializes the memory and then loads the code buffer passed to it into virtual memory as individual lines, marked by a carriage return (CR=0Dh) or a CR and line feed (CR LF=0D 0Ah) character codes. These lines are indexed into a source structure, whereby each line is assigned an address. Processing the source lines commences in pass 1, whereby all entry points defined in the code, such as menu entries, auto-executing procedures and procedures attached to standard system functions are placed in an entry-point table. In pass 2, all variables that are present in the code are extracted and placed in a variable structure within virtual memory. Each variable is stored as an address, the variable type, the variable name and the variable value.

After this the AVM processing core begins fetching instruction lines from the first entry point to the code. The line is decoded using the keyword list and the language rules. Variables references by the code line are fetched from the variable structure and processed. The variable value is then written back to the appropriate position. In case of an API call to perform an operating system function, the virtual API is referenced and it looks up the internal ordinal number of the API function, performs the simulated function and returns the simulated call values back to the HLL calling function. During execution the process flow causes flags in the behavior register 302 (FIG. 2) to be set or reset, and the sequence of these events to be stored in a sequencer structure 309 (FIG. 2). This process continues until all entry points in the entry point table have been processed, at which time the allocated memory is released, the behavior register value and the sequencer structure are returned to the application program for analysis, and the AVM is terminated.

In a present implementation, an analytical virtual machine in accordance with the present invention has three operating modes, a high level mode, a protected mode and a real mode. The real mode corresponds to an operating system such as DOS and the corresponding instance of the AVM is illustrated in FIGS. 1 and 6. The high level mode might be used to analyze a program in a high level language such as PERL (Practical Extraction and Report Language), Visual Basic, or a scripting language. A high level mode of the AVM is illustrated in FIGS. 2 and 7.

A protected mode instance of the AVM might be used to analyze thirty-two bit Windows code or Linux code. An illustration of the configuration of the AVM for protected mode use is illustrated in, for example, FIG. 3. The structure and operation of the FIG. 3 AVM is apparent from that illustration and the detailed discussion of the high level and real mode analytical virtual machines and so is not discussed further here. The primary difference as compared to the real mode implementation is the kernel and API functionality of the protected mode system. These aspects of the protected mode reflect the fact that it is already running a virtual machine and the fact that API calls are made rather than interrupts.

FIG. 4 illustrates the various memory maps that are used by the analytical virtual machine in the different modes identified here. As shown, the programs to be analyzed by the different mode devices load differently. Consequently, the analytical virtual machine is configured especially for each of these different modes and determines where the program to analyze is to begin execution and how the program should be analyzed. The memory allocation illustrated here is exemplary and is subject to optimization for particular systems. As such, future developments for future processors and programs are expected to alter the precise characteristics of the AVM and its implementations illustrated here.

The end product of an invocation of an AVM in accordance with preferred embodiments of the present invention are the contents of the behavior flag register and the sequencer. FIGS. 5A and 5B illustrate an exemplary and presently preferred set of behaviors that are tracked to characterize the code under analysis. This list of behaviors is presently preferred because it accurately tracks potentially malicious behavior and precisely characterizes presently contemplated forms of code. It is anticipated that future, different behavior sets or modifications of the illustrated behavior set might be desirable. The sequencer is a data structure that tracks the evolution of the behavior flag register. The sequence of setting the flags in the behavior register is particularly significant in analyzing and fully characterizing analyzed code. The sequencer is a data structure whose size is adapted to accurately characterize the code. Both the end pattern in the behavior register and the sequence of flag settings and resettings stored in the sequence are passed to the real machine just prior to terminating the virtual machine. The calling application program then uses the data in these structures to characterize the analyzed code.

The preceding discussion described a virtual machine that performs analysis of an application program (code) within a protected execution environment on a real computer. This analytical virtual machine (AVM) comprises a pre-processor which creates, in the memory reserved by the virtual machine, an image of the appropriate operating system under which the application software program is intended to execute. The AVM identifies the operating system and configures the execution environment by the file format and control fields within the header of the file that stores the application program and by the program code to be analyzed. The AVM is run by the operating system of the real computer to execute the application program contained within the AVM. No direct interaction is allowed to exist between the application program and the system software execution environment and/or the computer hardware.

An AVM is created by the computer immune system application for each analysis and is destroyed when that analysis is complete. The AVM is constructed out of a number of layered shells. The configuration of AVM shells depends on the format of the application program that needs to be analyzed; e.g. a software CPU shell is loaded in case native program code is analyzed, while in the case of high level language script or program code the appropriate language interpreter is loaded. Therefore, the processor core of the AVM exists either as a CPU executing native code or as a high level language interpreter. Operating system calls that are contained within the application software program are simulated in such a way that the application program appears to execute within a physical computer environment.

The application program is executed in several passes through the AVM, depending on the structure of the application software program, and may not be executed in any sequence as intended by the original creator of the application program. The aim of execution within the AVM is to perform an analysis that extracts the program code behavior under every condition contained within that program. Once this aim has been satisfied, the analytical virtual machine is terminated, preserving the generated behavior pattern and the sequencer structure, which contains the sequence in which events recorded in the behavior pattern have taken place.

The AVM described here is well suited for and is intended for use with the computer immune system and method described in U.S. patent application Ser. No. 09/642,625 filed Aug. 18, 2000. Application Ser. No. 09/642,625 is incorporated by reference in its entirety as disclosing further aspects of a preferred implementation and application of the described analytical virtual machine.

What is claimed is:

1. A computerized method for identifying malicious code in a target program running in a virtual machine of a computer system, the method comprising:
   evaluating a file format of the target program;
   evaluating control fields within a header of a file containing the target program;
   automatically configuring a memory map of the virtual machine by assigning areas of the memory map to receive predetermined types of data from the target program based on the file format in order to execute the target program, the virtual machine being capable of executing the target program in one of three modes of operation based on the file format and the control fields within the header of the file, a first mode of operation comprising a real mode for executing programs comprising instructions based on DOS, a second mode of operation for executing target programs comprising a high level programming language, and a third mode of operation comprising a protected mode for executing target programs comprising thirty-two bit code;
   constructing the virtual machine from one or more layered operating system shells that correspond with the memory map so that the virtual machine is capable of executing DOS target programs;
   simulating values of the computer system with the one or more layered operating system shells of the virtual machine;
   setting and resetting behavior flags in a register in order to track behavior of the target program in response to the simulated values during execution of the target program by the virtual machine;
   storing a sequence in which the behavior flags are set and reset in the register by the target program during execution of the target program by the virtual machine;
   passing behavior flag data and sequence flag data from the virtual machine to the computer system for evaluation after execution of the target program by the virtual machine;
   terminating the virtual machine after execution of the target program, thereby removing from the computer system a copy of the target program that was contained within the virtual machine; and
   evaluating the behavior flag data and sequence flag data with the computer system to determine if the target program contains malicious code.

2. The method of claim 1, further comprising initializing the virtual machine within the computer system, the virtual machine comprising a virtual computer implemented by software simulating functionality of a central processing unit and memory and a virtual operating system simulating functionality of an operating system of the computer system.

3. The method of claim 1, further comprising identifying a type of operating system intended for the target program that is to be executed by the virtual machine.

4. The method of claim 1, wherein the virtual machine executes the target program starting at each entry point defined within an entry point table.

5. The method of claim 1, further comprising loading a software CPU shell when the virtual machine operates in the first and third modes of operation.

6. The method of claim 1, further comprising loading a language interpreter when the virtual machine operates in the second mode of operation.

7. A computer system for discovering malicious code in a target program, comprising:
   a processing unit
   a memory storage device; and
   one or more program modules stored in said memory storage device for providing instructions to said processing unit;
   said processing unit executing said instructions of said one or more program modules, operable for
   evaluating a file format of the target program;
   evaluating control fields within a header of a file containing the target program;
   automatically configuring a memory map of a virtual machine by assigning areas of the memory map to receive predetermined types of data from the target program based on the file format in order to execute the target program, the virtual machine being capable of executing the target program in one of three modes of operation based on the file format and the control fields within the header of the file, a first mode of operation comprising a real mode for executing programs comprising instructions based on DOS, a second mode of operation for executing target programs comprising a high level programming language, and third mode of operation for executing target programs comprising thirty-two bit code;
   constructing the virtual machine from one or more layered operating system shells that correspond with the memory map so that the virtual machine is capable of executing DOS target programs;
   simulating values of the computer system with the one or more layered operating system shells of the virtual machine;
   setting and resetting behavior flags in a register in order to track behavior of the target program in response to the simulated values during execution of the target program by the virtual machine;
   storing a sequence in which the behavior flags are set and reset in the register by the target program during execution of the target program by the virtual machine;
   passing behavior flag data and sequence flag data from the virtual machine to the computer system after execution of the target program by the virtual machine; and
   evaluating the behavior flag data and sequence flag data with the computer system to determine if the target program contains malicious code.

8. The system of claim 7, wherein the processing unit is further operable for terminating the virtual machine after execution of the target program, thereby removing from the computer system a copy of the target program that was contained within the virtual machine.

9. The system of claim 7, wherein the virtual machine comprises a virtual computer implemented by the one or more program modules simulating functionality of a central processing unit and memory and a virtual operating system simulating functionality of an operating system of the computer system.

10. The system of claim 7, wherein the processing unit is further operable for identifying a type of operating system intended for the target program that is to be executed by the virtual machine.

11. The system of claim 7, wherein the virtual machine executes the target program starting at each entry point defined within an entry point table.

12. The system of claim 7, wherein the processing unit is further operable for loading a software CPU shell when the virtual machine operates in the first and third modes of operation.

13. The system of claim 7, wherein the processing unit is further operable for loading a language interpreter when the virtual machine operates in the second mode of operation.

14. A computer-implemented method for identifying malicious code in a target program comprising:

automatically configuring a memory map of a virtual machine by assigning areas of the memory map to receive predetermined types of data from the target program based on a file format to execute the target program, the virtual machine being capable of executing the target program in one of three modes of operation, a first mode of operation comprising a real mode for executing programs comprising instructions based on DOS, a second mode of operation for executing a target program comprising a high level programming language, and a third mode of operation comprising a protected mode for executing a target program comprising thirty-two bit code;

constructing the virtual machine from one or more layered operating system shells that correspond with the memory map so that the virtual machine is capable of executing DOS target programs;

simulating values of the computer system with the one or more layered operating system shells of the virtual machine;

setting and resetting behavior flags in a register in order to track behavior of the target program in response to the simulated values during execution of the target program by the virtual machine;

storing a sequence in which the behavior flags are set and reset in the register by the target program during execution of the target program by the virtual machine;

passing behavior flag data and sequence flag data from the virtual machine to a computer system after execution of the target program by the virtual machine;

terminating the virtual machine after execution of the target program, thereby removing from the computer system a copy of the target program that was contained within the virtual machine; and evaluating the behavior flag data and sequence flag data with a computer system to determine if the target program contains malicious code.

15. The computer-implemented method of claim 14, further comprising evaluating a file format of the target program.

* * * * *